United States Patent [19]
Sekido et al.

[11] Patent Number: 5,960,834
[45] Date of Patent: Oct. 5, 1999

[54] CURVED PIPE AND PROCESS AND APPARATUS FOR PRODUCING THE SAME

[75] Inventors: Toshihide Sekido, Otsu; Ryoichi Matsuura, Shiga; Tetsuyuki Kyono, Matsuyama; Kazuhiko Nishimura, Mishima; Kosuke Yoshimura, Otsu; Shinya Isoi, Kyoto; Haruo Obara, Ehime; Hiromitsu Kanamori, Kusatsu, all of Japan

[73] Assignee: Toray Industries, Inc., Japan

[21] Appl. No.: 08/553,347

[22] PCT Filed: Aug. 26, 1994

[86] PCT No.: PCT/JP94/01415

§ 371 Date: Nov. 16, 1995

§ 102(e) Date: Nov. 16, 1995

[87] PCT Pub. No.: WO95/25633

PCT Pub. Date: Sep. 28, 1995

[30] Foreign Application Priority Data

Mar. 24, 1994 [JP] Japan ............................. 6-79812

[51] Int. Cl.[6] ............................................. F16L 11/00
[52] U.S. Cl. ....................... 138/125; 138/172; 138/153; 138/174
[58] Field of Search ........................... 138/172, 174, 138/153, 123–127; 428/36.1, 36.3, 36.4

[56] References Cited

U.S. PATENT DOCUMENTS

| 3,481,369 | 12/1969 | Ganahl ................................ 138/153 X |
| 3,881,522 | 5/1975 | Lewis et al. ........................ 138/153 X |
| 4,139,025 | 2/1979 | Carlstrom ............................... 138/153 |
| 4,217,935 | 8/1980 | Grendelman et al. ............. 138/153 X |
| 4,657,795 | 4/1987 | Foret ................................... 138/172 X |
| 5,080,943 | 1/1992 | Chulpsa .............................. 138/172 X |

*Primary Examiner*—Patrick Brinson
*Attorney, Agent, or Firm*—Austin R. Miller

[57] ABSTRACT

An FRP curved pipe, particularly suitable for an FRP racket, good in resin flowability and deaeration at the time of molding, less in surface defects and excellent in strength can be obtained by a structure comprising an inner layer including a reinforcing fiber and an outer layer including a non-woven fabric having a single fiber diameter of not greater than 20 $\mu$m and a weight per unit area of not greater than 100 g/m$^2$.

18 Claims, 21 Drawing Sheets

CURVED PIPE AND PROCESS AND APPARATUS FOR PRODUCING THE SAME

TECHNICAL FIELD OF THE INVENTION

The present invention relates to a curved pipe of fiber reinforced plastics material (hereinafter, also referred to as merely "FRP") and process and apparatus for producing the same, and more specifically to a structure suitable for an FRP racket and process and apparatus for its production.

BACKGROUND ART OF THE INVENTION

There are various problems as described hereunder in conventional FRP curved pipes such as FRP rackets and frames of bicycles.

For example, in a conventional process for producing a racket, after cutting a woven fabric prepreg or a unidirectional prepreg of reinforcing fibers such as carbon fibers or glass fibers or a cross-stacking prepreg formed by crossing and stacking the unidirectional prepregs at a predetermined width, the cut prepregs are wound and stacked one layer by one layer around a core material coated with an expansive tube made from resin or rubber (a tube made from a film-like material which has an expansion property), as described in JP-A-HEI-5-96030. Then, the core material is removed, a preform obtained is placed in a mold, and while the mold is heated, the preform is pressure-molded by injecting a pressurized medium (for example, a pressurized air) into the inside of the expansive tube (generally, called "internal pressure molding").

In such an internal pressure molding, the circumferential length of the periphery of the preform is set to be less than the circumferential length of the inner surface of the cavity of the mold so as to facilitate charge of the preform into the cavity. When heated and formed, the preform is pressed onto the inner wall surface of the cavity by the pressure of the pressurized medium introduced into the expansive tube.

In such a conventional process, however, as shown in FIGS. 42 and 43, because prepregs 203 are wound and stacked one layer by one layer around a core material 202 coated with an expansive tube 201, a stacked portion (overlapped portion) is generated on each layer. Although all the layers must move (shift) in the circumferential direction ultimately at the time of heating and pressure molding in the mold, the movement is not completed in some portions because of the presence of many stacked portions. There fore, there occurs a case where an outer layer cannot reach the wall surface of the cavity, or a desired pressing force onto the wall surface cannot be generated even if the outer layer can reach the wall surface. Molding defects such as voids and lack of resin are frequently generated on an outer surface of a molded product from such causes. Therefore, there is a problem that nonuniformity of the surface quality and the strength of the molded product increases.

Moreover, in the formation of the preform, because prepregs 203 are wound one layer by one layer around the core material 202, the working efficiency is very bad.

In the above-described process, a molding in the mold is performed, for example, as shown in FIG. 44. In the figure, numeral 204 indicates an expansive tube after core material 202 is removed, numeral 205 indicates a preform, numerals 206 and 207 indicate a mold, and numeral 208 indicates a parting line. Numeral 209 indicates a core which forms a groove for gut strings of a racket and retreats at the time of mold opening.

A racket is generally constructed from complicated curved surfaces and molded in a closed cavity. Therefore, voids or pinholes 210 are likely to occur on a portion present at the farthest position from the meeting surface 208 of the mold and having a small curvature, as shown in FIG. 45. These defects must be filled with a putty, and this treatment deteriorates the productivity.

Further, in the conventional process, because an internal pressure is given to a preform composed of only woven fabric prepregs, unidirectional prepregs or a cross-stacking prepreg and having a high density of reinforcing fibers at the surface layer and the preform is heated and molded, when the internal pressure is given, the reinforcing fibers with a high density adhering to the inner wall surface of a cavity deteriorate the flowability of a resin, and this causes the deaeration to be damaged. If the resin flowability is reduced and the deaeration property is damaged, the above-described voids and pinholes 210 are likely to occur and the surface quality deteriorates.

Further, in the conventional internal pressure molding, a relatively low pressure (for example, not more than 0.8 MPa in a case of compressed air) is applied for the reasons described later. Therefore, there occur such problems as that a preform cannot be sufficiently adhered to an inner wall surface of a cavity and that voids are generated or resin lack occurs on some portions because the air in the cavity cannot escape completely.

In the production of a preform for a curved pipe such as a racket, there are a process wherein prepregs are wound by hand around a core material coated with an expansive tube one layer by one layer and in a predetermined order such that the orientation directions of the reinforcing fibers thereof are set to desired directions, and a rolling table process wherein prepregs are arranged on a table and the arranged prepregs are wound around a core material coated with an expansive tube by rolling the core material on the arranged prepregs.

In such processes, however, the working efficiency is bad, the working needs a long time, the quality obtained is not stable and automization thereof is difficult. If such a process is present in a process for producing a racket, the quality of molded rackets is not uniform and it causes increase of production cost.

In the internal pressure molding, generally a relatively low pressure is applied as aforementioned. If the pressure of a pressurized medium pressing a preform from the inside of the preform is low, on a surface, particularly on a surface of a molded product such as a racket constructed from complicated surfaces, a problem is likely to occur that voids and lack of resin originating from poor adherence of the preform to an inner wall surface of a cavity deteriorate the surface quality of the molded product. The part of the pressurized medium is to press the preform onto the inner wall surface of the cavity during the time until a resin is thermoset. As a concrete medium, usually a gas is used as JP-A-SHO 56-166862 exemplifies a nitrogen gas having a pressure of not less than 0.6 MPa and JP-A-SHO-53-9643 exemplifies a compressed air having a pressure of not lower than 3 MPa.

In such a process utilizing a gas as the pressurized medium, however, although the connection between an expansive tube and an external pressurizing apparatus is easy and a bad affect such as occurrence of soil of a molded product is less even if the gas leaks by a bad condition of the connection, a danger in handling is accompanied if the pressure is over 1.5 MPa because a gas is a compressible fluid, and in addition, the cost for the apparatus therefor is very high. Therefore, it is not practical to suppress surface defects by pressurizing the gas to a high pressure. Accordingly, a gas with a relatively low pressure has been employed. However, when the low-pressure gas is used, surface defects based on the low pressure are inevitably generated, and the cost for correcting the surface defects by post processing increases and this causes increase of the production cost.

Accordingly, it is expected that a process for using an incompressible fluid such as an oil is applied instead of such a process for using a compressible fluid such as a gas. However, because such an incompressible fluid gives a very great affect to the productivity when it leaks, a concrete means for applying such a process is not disclosed at all even in J-PA-SHO 56-166862.

Further, in the internal pressure molding, because a good adherence property of a preform to an inner wall surface of a cavity is required, the preform is desired to have a property for easily fitting the inner wall surface (a good fitting property). For such a requirement, a technology of internal pressure molding using a preform composed of a prepreg prepared by impregnating a resin into a tubular multi-layer braid is disclosed in JP-B-HEI 5-80329.

In this process, however, there is a problem that, because a non-solvent system resin is used and such a resin has a high viscosity, the resin is hard to be impregnated into the braid, and particularly, as the number of multiple layers of the braid becomes large, the resin is harder to be impregnated. Further, in order to facilitate its impregnation of its resin, a resin having a low viscosity must be selected, and therefore, the freedom of the selection of the resin is small. If the resin has a high viscosity, the production speed must be reduced. Moreover, there is a problem that the irregularity of the surface of the braid is large as compared with that of a unidirectional prepreg and therefore defects such as voids and pinholes are likely to occur on the surface of a molded product. Furthermore, although the braid is formed in a stretched condition depending upon the tension at the time of braiding, the braid has an expansive property because the structure thereof is loose, and when the tension is released, the elongation of the braid is recovered and the braid becomes thicker, and therefore the thickness and the length cannot be stable.

The above-described JP-B-HEI 5-80329 discloses a method for forming a tubular braid having a triaxial structure in order to solve the problem originating from the expansive property of the braid. However, although such a triaxial-structure braid can solve the problem of the expansive property in the axial direction, because the expansive property in the circumferential direction reduces at the same time, the fitting property to an inner wall surface of a cavity, which is a merit on use of the braid, is greatly injured.

On the other hand, as the process for producing an FRP curved pipe such as a tennis racket, so called resin transfer Molding is known, for example, as described in U.S. Pat. No. 3,755,037. In the process described in U.S. Pat. No. 3,755,037, a pressure-resistance tube is coated on a mandrel made by gathering steel wires, after helical winding layers of reinforcing fibers are formed on the mandrel, the mandrel is pulled off from the layers to form a preform, the preform is placed in a cavity of a lower mold which is formed as a required shape of a racket, an upper mold is closed, and without pressure reduction of the inside of the cavity, a resin is injected into the cavity to mold a racket by impregnating the resin into the preform while the inside of the tube is pressurized.

In this process, however, because the injection of the resin is performed without pressure reduction of the inside of the cavity, air present in the cavity cannot escape completely, and voids and pinholes are likely to be generated on the surface of the obtained racket.

Further, in a process disclosed in JP-A-HEI 3-176083, after a preform of reinforcing fibers is placed in a cavity of a mold, molten ω-lactam containing a catalyst for polymerization and an initiator is injected into the cavity, and it is heated and polymerized to mold a racket whose matrix is a polyamide resin.

In this process, however, because the polymerization reaction in the cavity accompanies a rapid reaction, setting of the amount of the initiator and the temperature is difficult, controlling of the degree of the polymerization and the time of the reaction is difficult, and therefore voids are likely to be generated. If voids or pinholes are generated on the frame surface, the quality of the surface is damaged, and if the content of the resin varies depending on the surface portions, the characteristics reduce or the weight balance cannot be maintained, and therefore the value of the product reduces.

DISCLOSURE OF THE INVENTION

In view of the above-described various problems, an object of the present invention is to provide a process and an apparatus which can prevent generation of voids, pinholes and resin deficient portions on a surface of a molded product and which is excellent in working efficiency, and is to provide FRP curved pipe and racket having excellent quality and characteristics as well as a stable quality.

To accomplish the above object, an FRP curved pipe according to the present invention comprises an inner layer including a reinforcing fiber and an outer layer including a non-woven fabric having a single fiber diameter of not greater than 20 $\mu$m and a weight per unit area of not greater than 100 g/m$^2$.

An FRP racket according to the present invention is a racket made from fiber reinforced plastics material and comprises an inner layer including a reinforcing fiber and an outer layer including a non-woven fabric having a single fiber diameter of not greater than 20 $\mu$m and a weight per unit area of not greater than 100 g/m$^2$.

In such an FRP curved pipe or racket, in the molding step, the layer of the non-woven fabric functions as a discharge path for a matrix resin applied with an internal pressure to easily reach to a parting line of a mold. When such a resin is discharged from the parting line of the mold, because bubbles present in the inside of a preformed base material and on the surface thereof are involved in the discharged resin, the deaeration becomes better and a molded product having very few voids and pinholes and a good surface quality can be obtained. Further, because the amount of the resin discharged increases as compared with that in a conventional racket, the weight of the molded product can be reduced, and because the fiber volume content in the whole of the outer shell layer increases, the strength can be increased. Therefore, a curved pipe and a racket good in appearance and surface quality and excellent in strength can be obtained.

If the single fiber diameter of the non-woven fabric is greater than 20 $\mu$m, the flatness of the surface of the molded product is injured because the roughness of the non-woven fabric becomes large, and further, it causes an excessive discharge of resin. If the weight per unit area is greater than 100 g/m$^2$, an excessive discharge of resin is also caused, and it causes voids and pinholes and further reduction of strength. If the weight per unit area is too great, because it causes increase of the weight of a molded product, the above-described low weight per unit area is preferred also from this point of view.

As the reinforcing fibers of the reinforcing fiber layer, high strength and high elastic modulus fibers such as carbon fibers, glass fibers and various organic fibers (for example, polyaramide fibers) can be used, and also as the fibers of the non-woven fabric layer, carbon fibers, glass fibers, polyaramide fibers, etc. can be used. As the fibers of the nonwoven fabric layer, carbon fibers are the most preferable because carbon fibers have a low specific gravity, the diameter of a carbon fiber is small and fluffs are difficult to be raised at the time of polishing after molding.

The reinforcing fiber material is formed as, for example, a woven fabric of the reinforcing fibers, a prepreg of the woven fabric, a unidirectional prepreg or a cross-stacking prepreg formed by stacking the unidirectional prepregs so that the directions of the reinforcing fibers thereof cross each other.

In the FRP curved pipe and racket according to the present invention, there are various formations with respect to the reinforcing fiber layer forming the inner layer. For example, a formation in which the reinforcing fiber layer includes a unidirectionally aligned material formed by aligning the reinforcing fibers in a single direction, a formation in which the directions of the reinforcing fibers are crossed at least in two directions in the reinforcing fiber layer, and a formation in which the reinforcing fiber layer includes a woven fabric or a braid of reinforcing fibers, can be employed. Further, the reinforcing fiber layer may include any combination of these formations. For example, the combination of the unidirectionally aligned material and the cross-stacking material whose reinforcing fibers are crossed in two directions can be employed.

In the inner layer with such a formation, as described later in the item of a preform in more detail, it is preferred that the reinforcing fiber layer forming the inner layer has four or less reinforcing fiber partial layers, each reinforcing fiber partial layer has plural laminae of reinforcing fiber materials and a C-shape cross section, and an opening of an inner reinforcing fiber partial layer is covered with an outer reinforcing fiber partial layer. In such a formation, forming a preform can be greatly facilitated.

Further, as described above, a structure including a braid of reinforcing fibers may be applied for the inner layer. Preferably, the braid of reinforcing fibers is formed as a multi-layer braid. By applying a braid, while a good fitting property which the braid has originally can be maintained, a good flowability of resin and a good deaeration property can be ensured by the presence of the nonwoven fabric layer, and a molded product having a good surface quality can be obtained.

The fibers forming the non-woven fabric are preferred to be short fibers having fiber lengths of 1 to 30 mm, more preferably 5 to 20 mm. The short fibers are dispersed in random directions in a two-dimensional plane, and form a nonwoven fabric by being bound with binder. If the fiber length is more than 30 mm, the flow of resin is obstructed, and if the fiber length is less than 1 mm, there is a fear that the fibers flow out together with the resin.

As the matrix resin of the curved pipe or racket according to the present invention, for example, a thermosetting resin such as an epoxy resin, an unsaturated polyester resin, a vinylester resin or a phenolic resin can be employed.

Further, in the present invention, process and apparatus for producing an FRP curved pipe or racket which can prevent generation of voids, pinholes and resin deficient portions on the surface and is excellent in working efficiency can be provided.

The process for producing an FRP curved pipe or racket according to the present invention comprises the steps of placing a preform, formed by covering an expansive tube with a prepreg of reinforcing fibers and disposed on a high pressure-resistance tube, in a cavity of a mold; heating the mold as well as the preform; and pressing the preform to an inner wall surface of the cavity by pressurizing the inside of the high pressure-resistance tube at a pressure of not lower than 3 MPa.

Further, the process for producing an FRP curved pipe or racket according to the present invention comprises the steps of placing a base material, formed by winding a non-woven fabric having a single fiber diameter of not greater than 20 $\mu$m and a weight per unit area of not greater than 100 g/m$^2$ around a preform formed by covering an expansive tube with a prepreg of reinforcing fibers, in a cavity of a mold; heating the mold as well as the base material; and pressing the preform to an inner wall surface of the cavity by pressurizing the inside of the expansive tube.

Furthermore, the process for producing an FRP curved pipe or racket according to the present invention comprises the steps of placing a base material, formed by winding a non-woven fabric having a single fiber diameter of not greater than 20 m and a weight per unit area of not greater than 100 g/m$^2$ around a preform formed by covering an expansive tube with reinforcing fibers, in a cavity of a mold; heating the mold as well as the base material; pressurizing the inside of the expansive tube; and injecting resin into the cavity while reducing the pressure in the cavity.

In the above processes, although the non-woven fabric is stacked on the outermost layer of the preform in the production stage, there is a fear that the non-woven fabric is enlarged by the stiffness of the fibers used for the non-woven fabric and it causes nip between molds when the molds are set. Accordingly, if the non-woven fabric is impregnated with a resin to give a adhesive property to the non-woven fabric, the working ability becomes better. Namely, it is preferred to prepare the non-woven fabric layer as a prepreg. When the non-woven fabric layer is prepared as a prepreg and it is served to the production, it is preferred that the impregnated resin is a same system resin as the matrix resin from the viewpoint of prevention of reduction of strength against delamination between layers.

In the present invention, a material wherein the layer of the non-woven fabric is disposed outside of the preform is called "a base material", and a material provided with no non-woven fabric and a material in a condition before the non-woven fabric is provided are called "a preform".

The apparatus for producing an FRP curved pipe or racket according to the present invention comprises a mold having a cavity in which a preform formed by covering an expansive tube with a prepreg of reinforcing fibers and disposed on a high pressure-resistance tube is placed; and means for supplying a pressurized medium of an incompressible fluid having a pressure of not lower than 3 MPa into the high pressure-resistance tube.

In such an apparatus, molding using a high-pressure fluid becomes possible, the preform can be pressed to the inner wall surface of the cavity in a good condition, and a molded product having a good surface quality can be obtained.

Further, the apparatus for producing an FRP curved pipe or racket according to the present invention comprises a split mold having upper and lower molds and a cavity in which a preform formed by covering an expansive tube with a prepreg of reinforcing fibers is placed; means for supplying a pressurized medium into the expansive tube; and a core constructed dividably and provided in the lower mold.

Furthermore, the apparatus for producing an FRP curved pipe or racket according to the present invention comprises a split mold having upper and lower molds and a cavity in which a preform formed by covering an expansive tube with reinforcing fibers is placed; means for supplying a pressurized medium into the expansive tube; means for reducing the pressure in the cavity; means for injecting resin into the cavity; and a core constructed dividably and provided in the lower mold.

In such apparatuses, particularly because the mold is constructed as a split mold as well as the lower mold includes therein a core constructed dividably, the working ability is good and the deaeration property and the flowability of resin in the cavity can be made better, and the quality of a molded product can be improved.

THE BEST MODE FOR CARRYING OUT THE INVENTION

Figure 1:
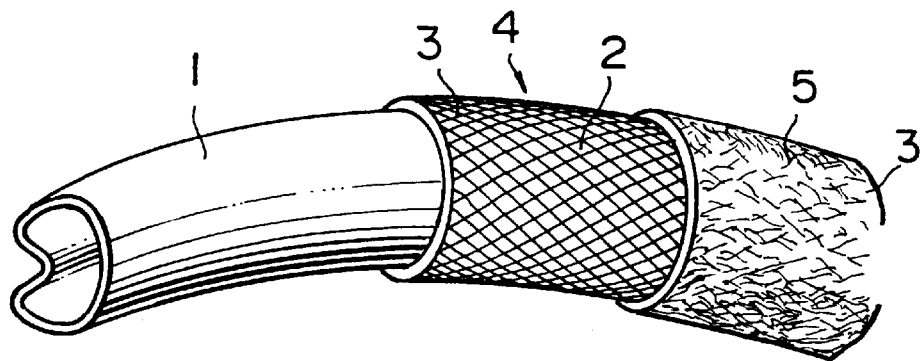
FIG. 1 is a partial perspective view of a curved pipe according to an embodiment of the present invention.

The structure of the above-described curved pipe or racket having a layer of a non-woven fabric is shown, for example, in FIG. 1. FIG. 1 illustrates the structure of layers of a frame portion of a racket according to the present invention, an expansive tube 1 is made from resin (for example, nylon) or rubber for serving to internal pressure molding is provided as the innermost layer, a reinforcing fiber layer 4 comprising reinforcing fibers 2 is provided outside of the expansive tube 1, and a layer of a non-woven fabric 5 is provided as the outermost layer. The reinforcing fiber layer 4 and nonwoven fabric layer 5 are hardened by resin 3, and an FRP is formed as a whole. However, there is a case where the expansive tube 1 is removed after molding and it is not present.

Although the thickness of the non-woven fabric layer is not particularly restricted, it is preferred to be in the range of 0.05 to 0.2 mm from the viewpoints of sureness of a good flowability of resin, prevention of generation of voids etc., and achievement of a light-weight molded product. The fiber volume content in the non-woven fabric is preferably in the range of 5 to 30%. From the same reason as that why the weight per unit area is specified not greater than 100 g/m$^2$, if the fiber volume content is too high, the flowability of resin is injured as well as the weight of the molded product increases. On the contrary, if the fiber volume content is too low, the advantages due to the presence of the non-woven fabric are injured.

The non-woven fabric may be disposed over the full length of the curved pipe or racket, or may be disposed partially in the length direction. For example, the non-woven fabric may be disposed over the full length of a portion other than a grip of the racket, or may be disposed on a portion near a yoke portion. Particularly, because the connecting portion between the frame and the yoke and the vicinity thereof are portions in which voids or pinholes are likely to occur when molded, the advantages according to the disposition of the non-woven fabric is great.

Further, the non-woven fabric may be disposed over the full circumference of the curved pipe or the frame of the racket, or may be disposed partially, for example, on a portion other than a groove portion for gut strings of the frame in the circumferential direction.

As the structure of the non-woven fabric, a structure of stacking a plurality of layers can be employed. The non-woven fabric is preferred to be provided by winding a non-woven fabric with a predetermined width on the curved pipe or a frame of the racket in circumferential direction thereof not by so-called spiral winding. By this, the process can be simplified as well as the overlapped area of the non-woven fabric can be reduced and the flatness of the surface can be improved.

Furthermore, a core material composed of a honeycomb material or a wood material or a honeycomb material can be disposed at least partially in the inside of the reinforcing fiber layer provided on a frame and/or a yoke of the racket. By disposition of such a core material, a necessary portion can partially be further reinforced and the strength can be increased.

The above-described FRP curved pipe and racket is preferably produced by using the following preform.

Namely, t he preform for molding the FRP curved pipe or racket according to the present invention comprises four or less reinforcing fiber partial layers, each reinforcing fiber partial layer has plural laminae of reinforcing fiber materials and a C-shape cross section, and an opening of an inner reinforcing fiber partial layer is covered with an outer reinforcing fiber partial layer. The reinforcing fiber materials are preferably made as prepregs.

In the conventional preform, as aforementioned, the working ability has not been good, the working has taken a long time and the quality has not been stable.

Figure 2:
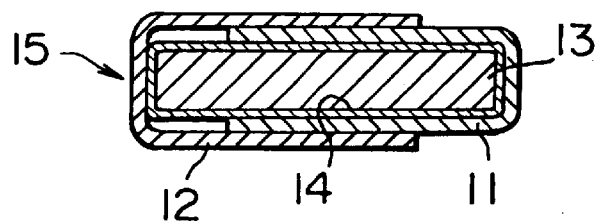
FIG. 2 is a cross-sectional view of a preform according to an embodiment of the present invention.
Figure 3:
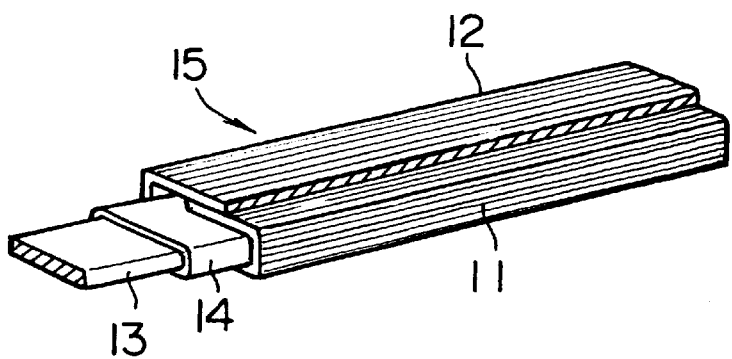
FIG. 3 is a partial perspective view of the preform shown in FIG. 2.

The preform according to the present invention is constituted, for example, as shown in FIGS. 2 and 3. In the figures, reinforcing fiber partial layers 11 and 12 constituting a reinforcing fiber layer are formed on a core material 13 coated with an expansive tube 14 (for example, a nylon tube), each of the reinforcing fiber partial layers 11 and 12 has a lamination structure of a plurality of reinforcing fiber materials and the cross section of each reinforcing fiber partial layer is C-shaped. The reinforcing fiber materials are made as prepregs. The opening of the inner reinforcing fiber partial layer 11 is covered with the outer reinforcing fiber partial layer 12. Such a preform 15 is served to internal pressure molding after the core material 13 is removed.

Figure 4:
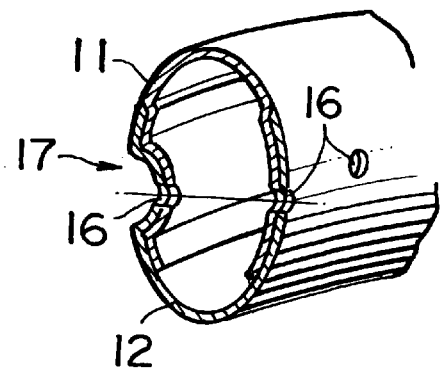
FIG. 4 is a partial perspective view of a preform for a racket according to an embodiment of the present invention.

In application to molding a racket, the preform 15 as shown in FIG. 3 is preferably formed such that gut holes 16 and gut groove 17 are positioned on the overlapped portions, for example, as depicted in FIG. 4.

Figure 5:
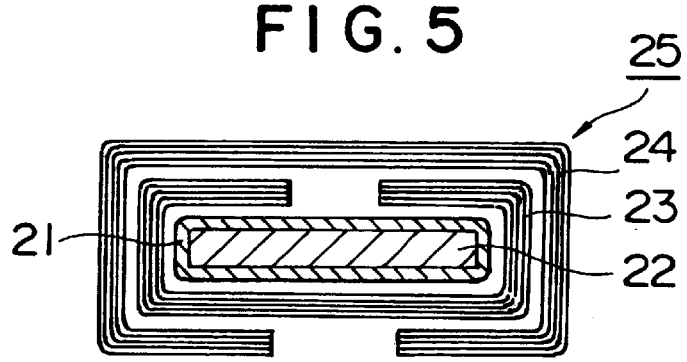
FIG. 5 is a cross-sectional view of a preform according to another embodiment of the present invention.

Further, except the embodiment shown in FIG. 3, for example, as shown in FIG. 5, a preform 25 in which the overlapped area of reinforcing fiber partial layers 23 and 24 provided on the core material 22 coated with the expansive tube 21 are further enlarged can be employed.

Although two reinforcing fiber partial layers are used in the embodiments shown in FIGS. 3 and 5, the number of the reinforcing fiber partial layers may be further increased as needed. However, if the number is too many, the difference between the embodiments and the conventional formation wherein reinforcing fiber layers or prepregs thereof are wound one layer by one layer becomes small. Accordingly, in such a case, the number of reinforcing fiber materials may be increased and the number of the reinforcing fiber partial layers may be set not to exceed four.

Such a preform is prepared by, for example, the following process.

For example, the process for making the above-described preform comprises the steps of winding a first reinforcing fiber partial layer material with a width at least smaller than the entire circumferential length of an expansive tube on the expansive tube coated on a core material, and winding a second reinforcing fiber partial layer material on the wound first reinforcing fiber partial layer material so as to cover the opening of the wound first reinforcing fiber partial layer material. Usually the first and second reinforcing fiber partial layer materials are formed by stacking a plurality of reinforcing fiber materials, respectively. Further, the first and second reinforcing fiber partial layer materials are prepared as prepregs, respectively.

Figure 6:
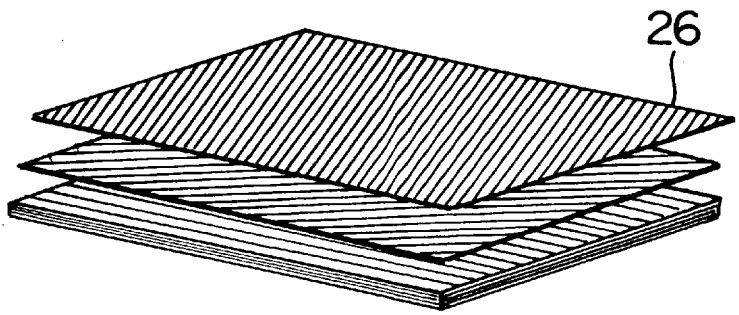
FIG. 6 is a perspective view showing stacking of prepregs for forming a preform.
Figure 7:
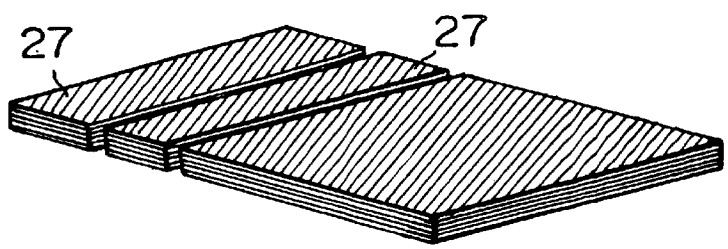
FIG. 7 is a perspective view showing cutting of stacked prepregs.
Figure 8:
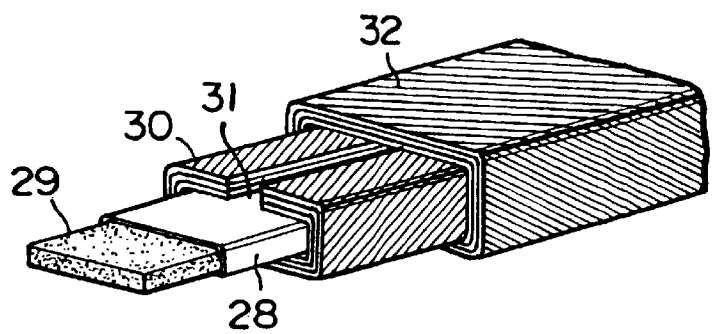
FIG. 8 is a partial perspective view of a preform made from prepregs shown in FIG. 7.

For example, as shown in FIG. 6, a plurality of reinforcing fiber materials 26 prepared as prepregs are stacked by a predetermined number. Then, as shown in FIG. 7, the stacked reinforcing fiber materials 26 are cut at a predetermined width to make first and second reinforcing fiber partial layer materials 27. Thereafter, as shown in FIG. 8, the first reinforcing fiber partial layer material is wound on a core material 29 coated with, for example, a nylon tube 28 to form a first reinforcing fiber partial layer 30, and then, the second reinforcing fiber partial layer material is wound thereon so as to cover the opening 31 of the first reinforcing fiber partial layer 30 and overlap with the first reinforcing fiber partial layer 30 at both sides of the opening 31 to form a second reinforcing fiber partial layer 32. Thus, preform 25 as shown in FIG. 5 is made.

In such a preform with a so-called two-part structure, molding can be easily performed because the total number of interlayer portions movable at the time of the molding is only two, as compared with the conventional case of preform formation by stacking one layer by one layer. Namely, both reinforcing fiber partial layer materials can easily move at the time applied with an internal pressure, defective movement can be suppressed and defects on molding almost are not generated. Further, because the winding on the core material may be only two times, the working time is less and the working is efficient. Furthermore, since the winding times are less and the winding reinforcing fiber partial layer materials have a high stiffness because they have been formed as a multi-layer material of reinforcing fiber materials, winding by a machine, that is, automization of winding can be facilitated. Although the above-described embodiment is explained as an example of a two-part structure having two reinforcing fiber partial layer materials, enough advantages can be obtained even in a four-part structure from the viewpoints of improvement of moldability and working ability and automization.

A non-woven fabric 5 is preferably provided outside of the preform 25 formed as described above, as shown in FIG. 9. In the non-woven fabric layer 5, it is preferred that the single fiber diameter is not greater than 20 μm and the weight per unit area is not greater than 100 g/m².

The above-described preform with a so-called two part-structure can be prepared by using the following apparatus.

For example, an apparatus for producing a pipe-like preform such as one described above comprises a first press means movable in a vertical direction and composed of a pair of upper and lower parts for supporting a core material coated with an expansive tube and reinforcing fiber partial layer materials provided on the core material as well as pressing the partial layer materials onto the upper and lower surfaces of the core material along the outer shape of the core material, and a second press means movable in a horizontal direction and composed of a pair of right and left parts for bending the partial layer materials along the outer shape of the core material and pressing the bent partial layer materials onto the side surfaces of the core material. The second press means, for example, is constructed in a structure of two steps in the vertical direction.

For example, as illustrated in FIGS. 10 to 13, the preform having a formation shown in FIG. 5 can be prepared as follows by using an apparatus equipped with upper and lower pressing plates 41 and 42 and pressing plates 43, 44, 45 and 46 arranged on the left and right sides at two steps in the vertical direction.

Figure 10:
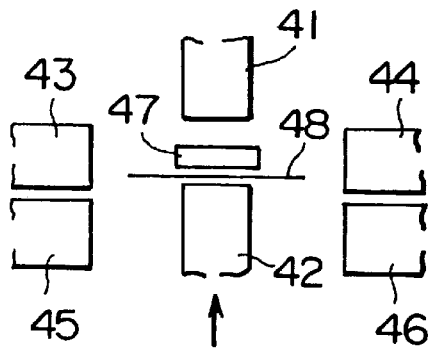
FIG. 10 is a schematic view showing a process for producing a preform according to an embodiment of the present invention.
Figure 11:
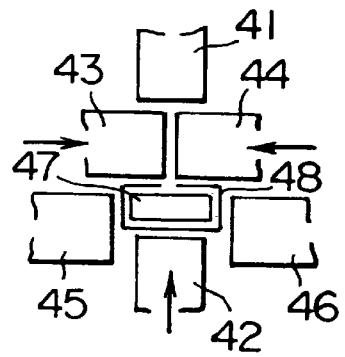
FIG. 11 is a schematic view showing a step in the process shown in FIG. 10.

Firstly, as shown in FIG. 10, after lower pressing plate 42 moves upward, a partial layer material 48 and a core material 47 coated with a tube are placed in order on the lower pressing plate 42. Then, the lower pressing plate 42 is moved downward, and the partial layer material 48 is bent by using left lower pressing plate 45 and right lower pressing plate 46. Thereafter, as shown in FIG. 11, left upper pressing plate 43 and right upper pressing plate 44 proceed up to a center line, the partial layer material 48 is bent as a schematic C-shape, and the C-shape is fixed by the upward movement of the lower pressing plate 42 and pressing thereby.

Figure 12:
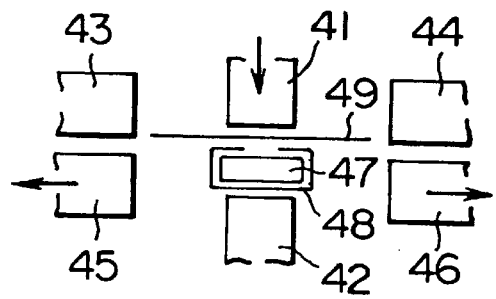
FIG. 12 is a schematic view showing another step in the process shown in FIG. 10.

Next, after a next partial layer material 49 is disposed on the core material 47, as shown in FIG. 12, the partial layer material 49 and the core material 47 are nipped by the downward movement of the upper pressing plate 41. Then, the left lower pressing plate 45 and the right lower pressing plate 46 retreat.

Figure 13:
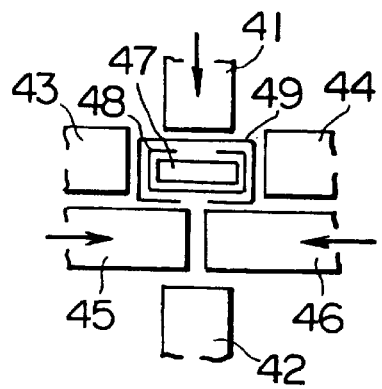
FIG. 13 is a schematic view showing a further step in the process shown in FIG. 10.

Next, the lower pressing plate 42 is moved upward as well as the partial layer material 49 is bent by using left upper pressing plate 43 and right upper pressing plate 44. After the lower pressing plate 42 is moved downward, as shown in FIG. 13, left lower pressing plate 45 and right lower pressing plate 46 proceed up to a center line, the partial layer material 49 is bent as a schematic C-shape, and the C-shape is fixed by the downward movement of the upper pressing plate 41 and pressing thereby. A preform as shown in FIG. 5 can be prepared by retreating the pressing plates and taking up the formed preform.

In the formation of the preform using the above-described apparatus, the partial layer materials can be semi-automatically wound around the tube-coated core material by disposing the partial layer materials and the tube-coated core material in order and operating the six pressing plates in the apparatus in order. Further, because the winding times basically may be two times, a long-size preform stable in quality can be prepared efficiently in a short period of time.

In the preparation of a preform for molding of the FRP curved pipe or racket according to the present invention, it is possible to automize the process including a step for coating an expansive tube on a core material. Namely, it is possible to automatically prepare a desired preform by enabling to successively perform a step for attaching an expansive tube to a core material, a step for winding partial layer materials around the core material and a step for taking the formed preform off from the core material.

The process for preparing a preform to achieve this automization comprises basically, for example, a tube attaching step for coating an expansive tube on a core material, a winding step for winding partial layer materials around the expansive tube coated on the core material to make a preform, a preform taking-off step for taking the preform off from the core material, and a step for returning the core material, from which the preform has been taken off, to the tube attaching step. Further, transfer steps are appropriately provided between the above steps. More concretely, the following process can be applied.

Namely, the process comprises:

a tube attaching step for coating an expansive tube on a core material;

a step for transferring the core material coated with the expansive tube to a winding means;

a step for disposing at least a first reinforcing fiber partial layer material with a width less than the entire circumferential length of the expansive tube and a second reinforcing fiber partial layer material at a condition with a predetermined overlapped width, each reinforcing fiber partial layer material being formed by stacking a plurality of prepregs of reinforcing fiber materials;

a winding step for winding the first reinforcing fiber partial layer material around the expansive tube coated on the core material and thereafter winding the second reinforcing fiber partial layer material around the first reinforcing fiber partial layer material so as to cover the opening of the first reinforcing fiber partial layer material to make a preform, using the winding means;

a step for transferring the preform together with the core material to a preform taking-off means;

a preform taking-off step for taking the preform off from the core material using the preform taking-off means; and a step for returning the core material, from which the preform has been taken off, to the tube attaching step.

As an apparatus for producing a preform corresponding to the above process, for example, the following apparatus can be used. The apparatus comprises a tube attaching means for coating an expansive tube on a core material, a partial layer material winding means for winding partial layer materials around the expansive tube coated on the core material to make a preform, a preform taking-off means for taking the preform off from the core material, a rotation means for transferring the core material in order between the above three means, and a partial layer material supply means for supplying partial layer materials to the partial layer material winding means.

Figure 14:
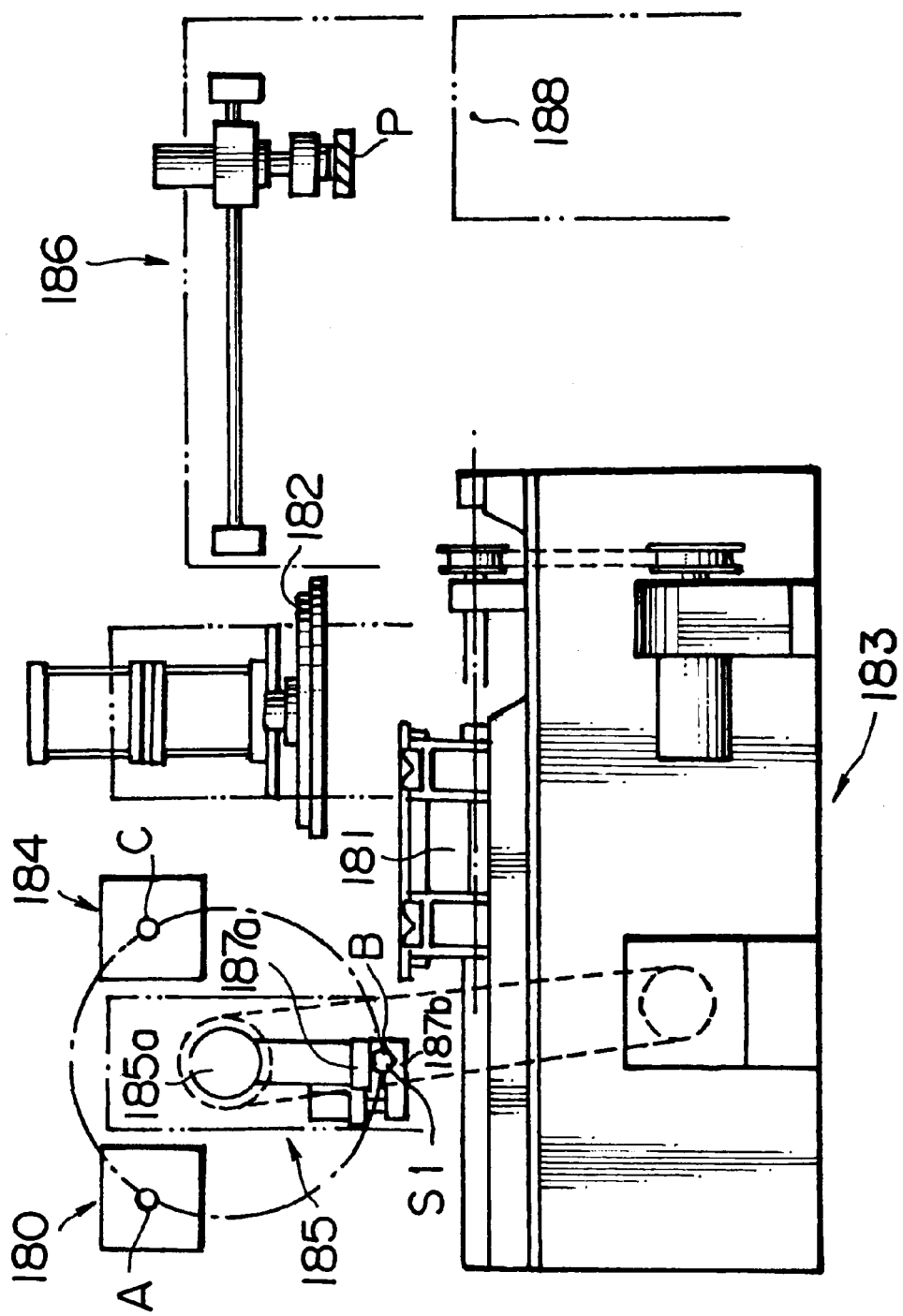
FIG. 14 is a schematic side view of an apparatus for producing a preform according to another embodiment of the present invention.

Further more concretely, for example, as shown in FIG. 14, the apparatus for producing a preform comprises:

- a tube attaching means 180 for coating an expansive tube on a core material S1;
- a partial layer material winding means 183 having a table 181 sliding in a horizontal direction and a pressing plate 182 positioned above the table 181 and moving in a vertical direction for rotating the core material coated with the expansive tube by sliding the table 181 while pressing the core material placed on the table 181 by the pressing plate 182 to wind partial layer materials P disposed on the table around the expansive tube coated on the core material to make a preform;
- a preform taking-off means 184 for taking the preform off from the core material;
- a rotation means 185 for transferring the core material S1 in order between the above three means of the tube attaching means 180, the partial layer material winding means 183 and the preform taking-off means 184; and
- a partial layer material supply means 186 for successively supplying required partial layer materials P from a stock 188 of partial layer materials to the partial layer material winding means 183.

Preferably the rotation means 185 has three sets of chucks 187a and 187b, the core materials S1 held by the three sets of chucks, respectively, are transferred in order between the three means of the tube attaching means 180, the partial layer material winding means 183 and the preform taking-off means 184.

For example, this rotation means 185 can be constructed as follows. Three set of chucks 187a and 187b for holding the core materials S1 are disposed around a center of rotational axis 185a, and three core materials S1 held by the respective chucks are transferred in order between the steps.

The tube attaching means 180 automatically coats an expansive tube on the core material S1 present at a position A. The tube attaching means 180 is constructed, for example, as shown in FIG. 15.

Figure 15:
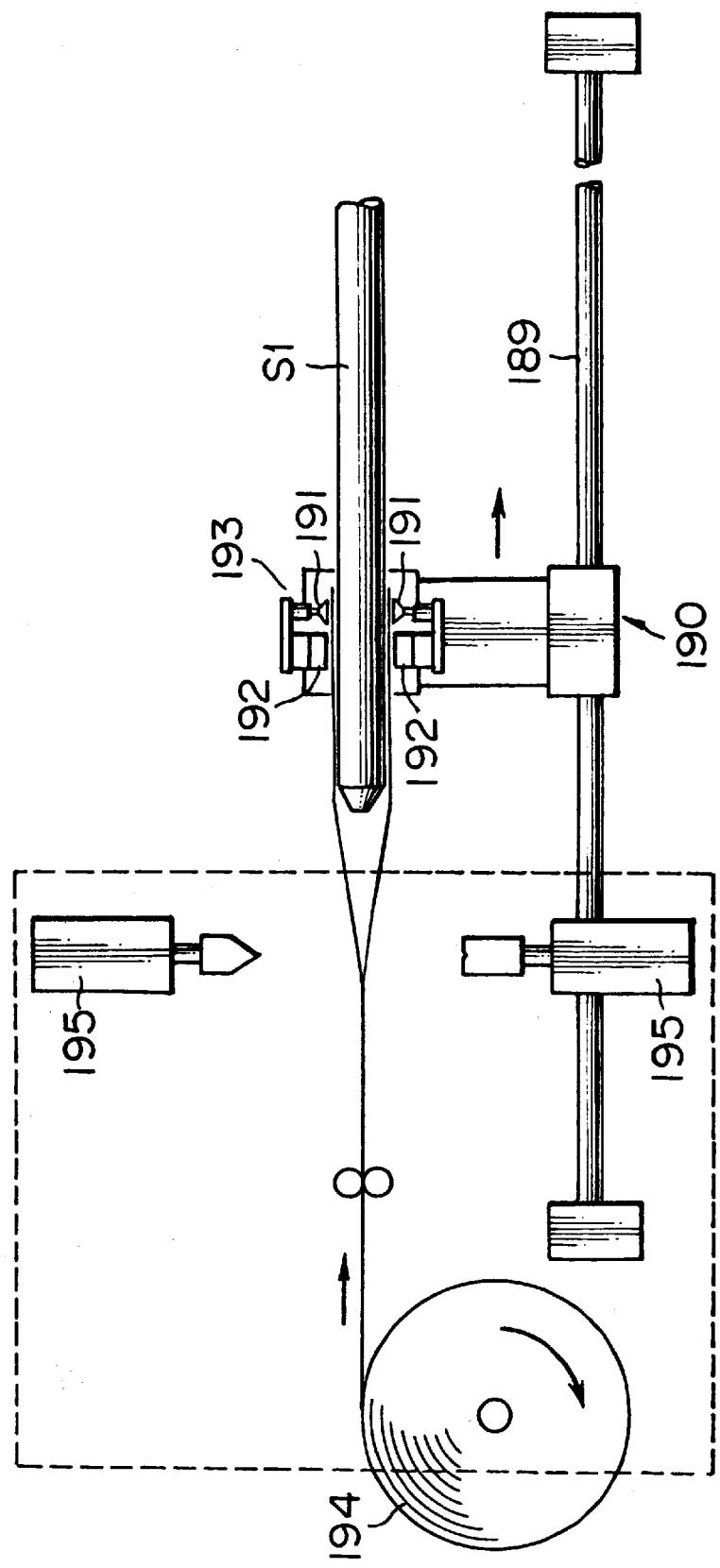
FIG. 15 is a schematic side view of a tube attaching means in the apparatus shown in FIG. 14.

In FIG. 15, a slider 190 is provided on a guide 189 extending in parallel to the core material S1, drivably in left and right directions of the figure. An expansive tube 194 is drawn out by a chuck 193 opening and closing in a parallel chucking state which has vacuum pads 191 and rubber blocks 192, and after the tube is coated on the core material S1, the continuous expansive tube 194 is cut by a cutting device 195, and thus the tube attaching step is finished.

Figure 16:
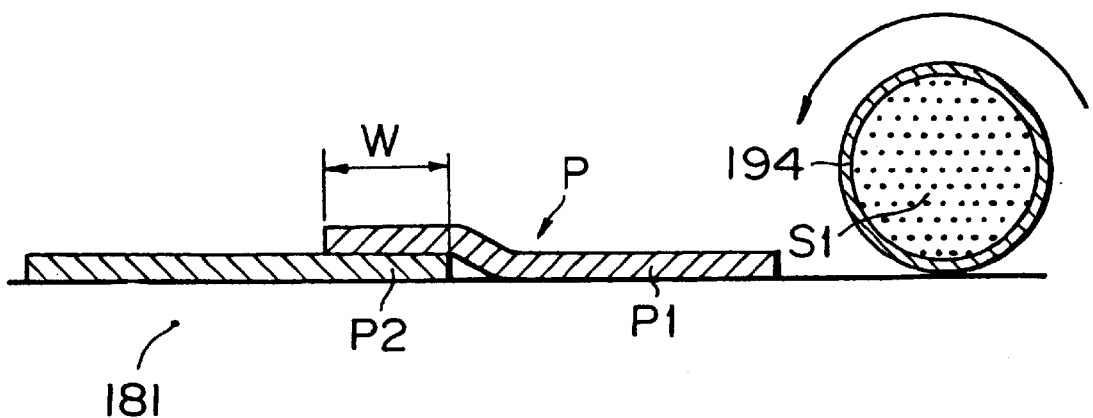
FIG. 16 is an enlarged, partial, vertical sectional view showing winding state of prepregs in the apparatus shown in FIG. 14.
Figure 17:
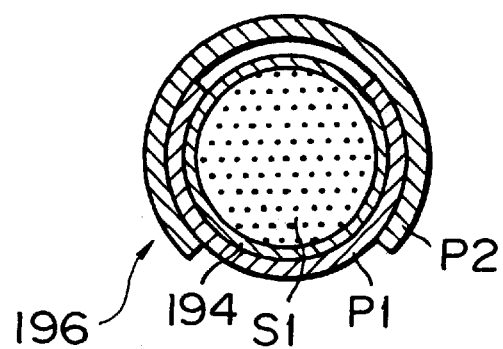
FIG. 17 is a sectional view of a preform and a core material formed by the process shown in FIG. 16.

The core material S1 coated with the expansive tube 194 is transferred to the slide table 181 at a position B (FIG. 14). Then, as shown in FIG. 16, the core material S1 coated with the expansive tube 194 is rolled on partial layer materials P1 and P2 forming a partial layer material P which are disposed on the table 181 with a predetermined overlapped width W, by the sliding operation of the table 181 and the pressing operation of the pressing plate 182. By the winding operation, as shown in FIG. 17, a preform 196 is formed on the core material S1. Because the cross-sectional shape of the core material S1 is a circle in this embodiment, such a rolling operation can be utilized. After winding the partial layer materials, the core material S1 is transferred to a position C (FIG. 14), and the formed preform 196 is taken off from the core material S1.

The preform according to the present invention may be formed as a structure with a tubular braid except the above-described preform with a two part structure.

Namely, the preform used for forming an FRP curved pipe or racket according to the present invention comprises a tubular braid composed of reinforcing fibers and a non-woven fabric disposed outside of the braid. At least the braid is made as a prepreg. As the braid, a multi-layer tubular braid can be used.

Figure 18:
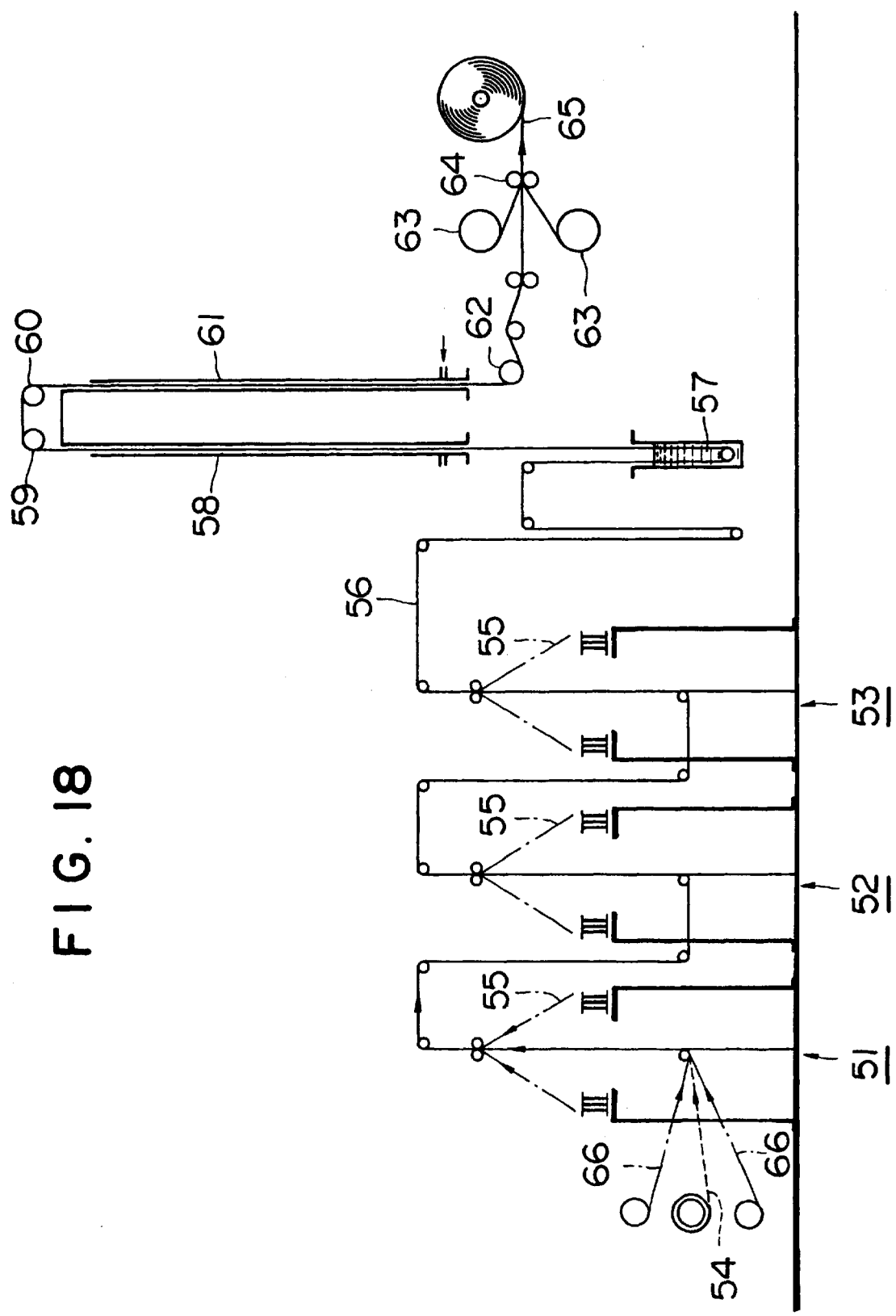
FIG. 18 is a schematic view showing a process for producing a preform according to another embodiment of the present invention.

The process for producing such a braid preform will be explained referring to, for example, an apparatus shown in FIG. 18.

Using braiding machines 51, 52 and 53 in a multiple stage condition (in this embodiment, three stages), bundles of reinforcing fibers 55 are braided in a multi-layer condition on an expansive tube 54. A braid 56 to impregnate t resin solution 57 to impregnate the resin into the braid, the solvent is dried by passing the braid through a heat-drying apparatus 58, watercooling turning rollers 59 and 60 and a heat-drying apparatus 61, and after passing through a water-cooling turning roller 62, nonwoven fabrics 63 are laminated from upper and lower directions. After the braid with the non-woven fabrics 63 is pressed by a calendering apparatus 64, the multi-layer braid prepreg 65 is wound.

In such process and apparatus, the braiding angle (relative to the axial direction: 0 degree) is preferably in the range of 10 degrees to 60 degrees, and the angles of the respective layers may be either the same or different. The fiber volume content thereof is preferably in the range of 40 to 70% (resin volume content: 30–60%).

As the material of the expansive tube 54, a polymer material such as a nylon, a polyester, a polypropylene, a silicone or a rubber system material can be employed. Further, as shown in the figure, bundles of fibers or tape-like fabrics 66 (woven fabric, non-woven fabric, synthetic resin film, etc.) may be passed together with the expansive tube 54 to form a multi-layer braid thereon.

As the resin to be impregnated, a thermosetting resin such as an epoxy, an unsaturated polyester or phenol can be used. Further, as the reinforcing fibers, carbon fibers, glass fibers, polyaramide fibers and other reinforcing fibers can be used. A hybrid structure of different fibers is also available. For example, a hybrid structure of carbon fibers and glass fibers or polyaramide fibers can be applied.

In such a process, it is preferred that the viscosity of the resin to be impregnated is controlled by dilution by a solvent in order to facilitate the impregnation of the resin. A complete impregnation can be achieved by the control of the viscosity even if the braid is formed as a multi-layer structure. Moreover, there is no restriction on composition of the resin because of solvent system, and a raw material soluble to a solvent can be freely selected and used.

Further, the surface defects such as voids and pinholes generated when molded can be almost completely prevented by disposing the non-woven fabric on the surface of the braid. The non-woven fabric is composed of carbon fibers, glass fibers, polyaramide fibers or other reinforcing fibers.

Furthermore, in order to improve a dimensional stability of the braid which has been a conventional problem, the elongation of the braid may be suppressed. As means for realizing this, to pass the bundles of fibers or tape-like fabrics 66 can be applied for suppressing the elongation as well as the expansive tube, and by this, a good dimensional stability of the braid can be ensured as well as it can be operated as a reinforcing material in the axial direction without giving a damage to the fitting property to an inner wall surface of a cavity which has been a defect in the conventional triaxial braid.

Figure 19:
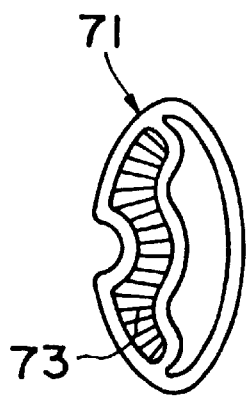
FIG. 19 is a sectional view showing an example of a racket frame buried with a honeycomb material.
Figure 20:
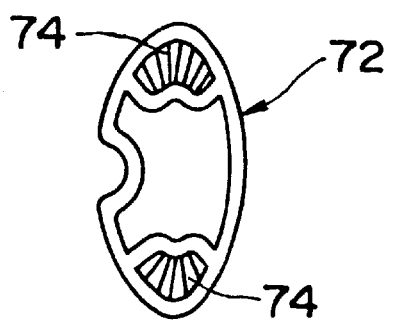
FIG. 20 is a sectional view showing another example of a racket frame buried with a honeycomb material.

In the present invention, when forming a preform with a predetermined shape for serving to molding the curved pipe or racket, a core material composed of a honeycomb material or a wood material can be disposed at least partially in the tubular preform. For example, in a case of a racket, as shown in FIGS. 19 and 20, a honeycomb material 73 or 74 can be disposed in a frame 71 or 72 to form a sandwich structure. In such a structure, prevention of breakage of the frame wall due to a gut tension (increase of the strength against gut stretching), light-weight structure and increase of the stiffness can be achieved. The position where the honeycomb material 73 or 74 is disposed is set to the outer side of the frame curvature for the purpose of increase of the strength against gut stretching (FIG. 19) and set to the upper and lower portions in the cross section of the frame for the purpose of increase of the stiffness (FIG. 20).

Further, a similar structure can be applied also on a yoke portion of a racket. Namely, the conventional yoke has been formed mainly by disposing foamed materials such as EVA (ethylene vinyl alcohol) sheets on both surfaces of a urethane foamed material, winding the material around a prepreg and forming the yoke by heating (foaming of EVA) and curing at the time of frame molding. In this process, however, because a sufficiently high internal pressure cannot be applied and the urethane foamed material which is a core does not have a reinforcing effect, the FRP layer must be thicker and it causes increase of the weight.

Figure 21:
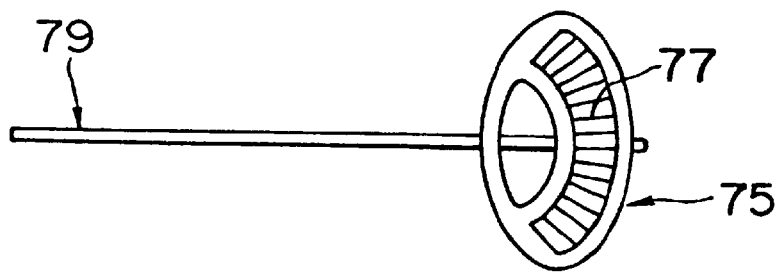
FIG. 21 is a sectional view showing an example of a yoke portion buried with a honeycomb material.
Figure 22:
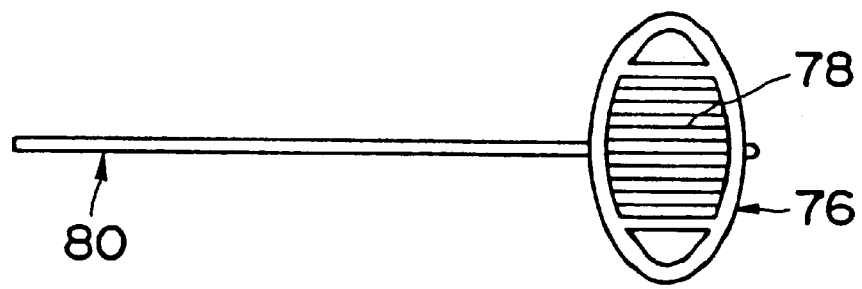
FIG. 22 is a sectional view showing another example of a yoke portion buried with a honeycomb material.

Accordingly, as shown in FIGS. 21 and 22, honeycomb material.77 or 78 is disposed in yoke 75 or 76 and thereby preventing the yoke portion from breakage due to the tension of gut 79 or 80. The position for the disposition of the honeycomb material 77 or 78 is basically set so that the honeycomb material comes into contact with the outer shell, and it may be molded together with a foamed material. If such a foamed material is used together, a sandwich structure contacting also with the inner shell (hitting surface side) can be realized.

Next, a process for giving a form to the preform or the base material (which is formed by disposing a non-woven fabric on a preform) will be explained. The following explanation is carried out with respect to a preform.

The long-size preform formed as described above is given a form depending upon the shape of a curved pipe or racket to be molded, in advance before an FRP is molded.

For example, before a preform made for molding a racket is placed in a cavity of a mold used for the molding, using a mold with a shape which is substantially the same as that of the cavity, for example, using a mold (for example, wooden mold) having a projected portion formed as a shape along the shape of the cavity, while a tension is given to the preform, the preform is pressed onto the outer side surface of the projected portion by a pair of pressing rollers to give a form to the preform along the shape of the projected portion.

Figure 23:
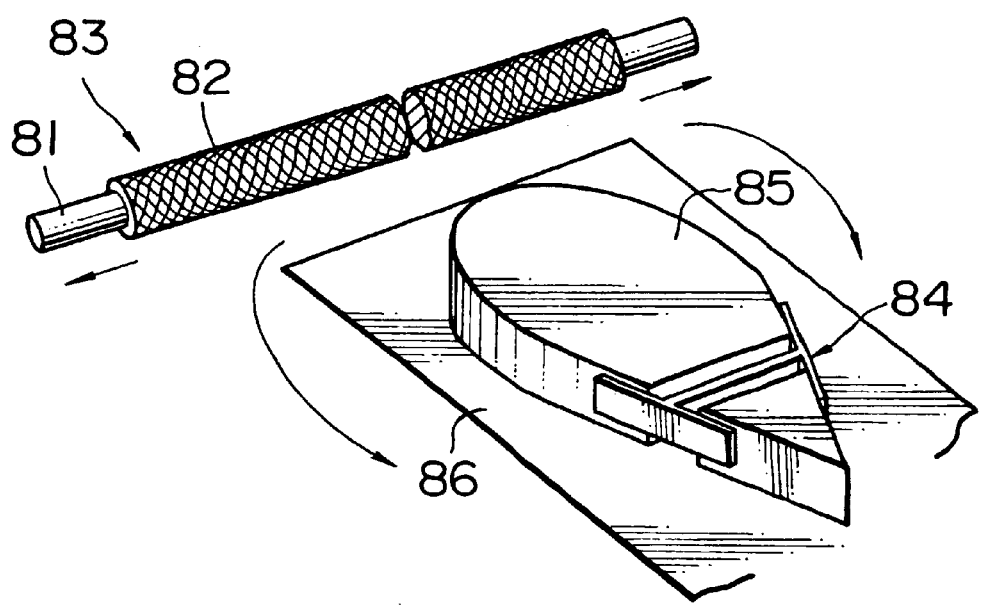
FIG. 23 is a perspective view showing a process for giving a form to a preform.

More concretely, as shown in FIG. 23, while a tension is given to (or held for) a long-size preform 83 wherein a predetermined reinforcing fiber layer 82 is formed on an expansion tube 81, or as needed, a base material provided with a non-woven fabric as aforementioned (not shown), in both outer directions of the longitudinal direction of the preform, the preform is fitted to the outer side surface of a projected portion 85 of a mold 86 to which a preform 84 for the yoke portion has been attached to give a form to the preform 83.

Figure 24:
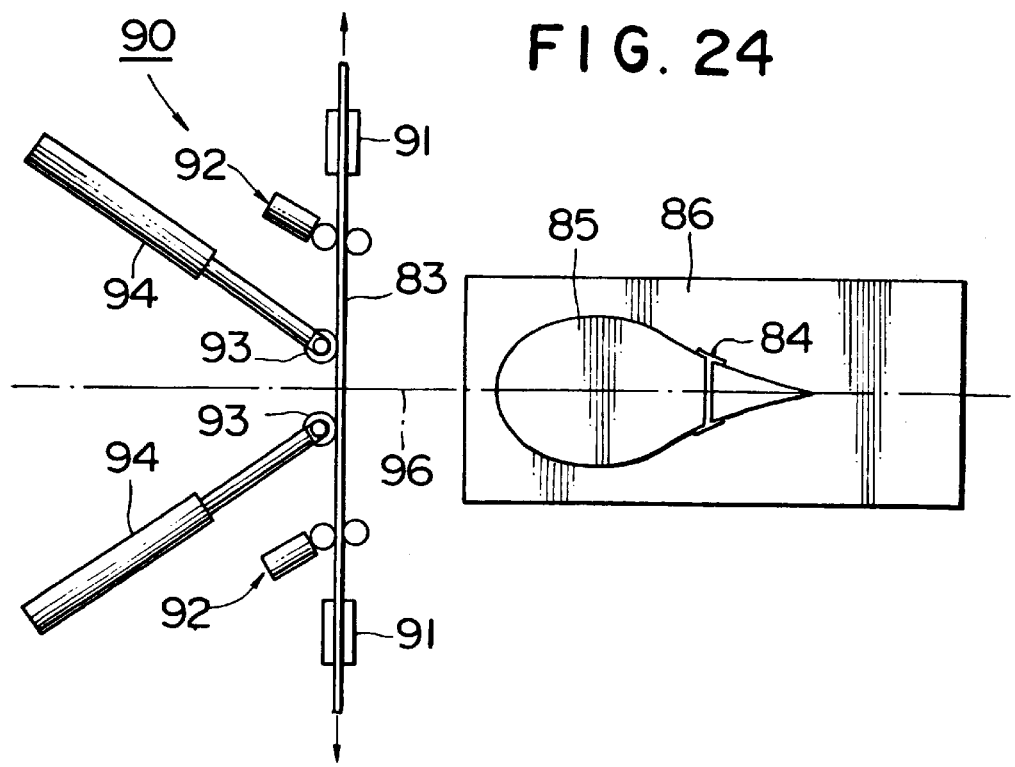
FIG. 24 is a schematic plan view of an automatic forming machine for giving a form to a preform.

This forming can be carried out using an automatic forming machine 90 such as one shown in FIG. 24. In FIG. 24, preform guides 91 are provided on both sides of the machine, and a tension is given to (held for) the preform 83 by a pair of tension holding mechanisms 92 when a form is given. A pair of pressing rollers 93 press the preform 83 onto the outer side surface of the projected portion 85 of the wooden mold 86 symmetrically on the right and left sides by the operation of air or hydraulic cylinders 94.

Firstly, as shown in FIG. 24, straight and flat-type preform 83 is disposed at a preform setting position. Then, H-shaped preform 84 for a yoke portion is disposed at a yoke portion setting position of the mold 86. At that time, the mold 86 and the pressing rollers 93 are present at respective initial positions. Tension holding mechanisms 92 (rollers) nip the preform 83 and hold the tension thereof.

Figure 25:
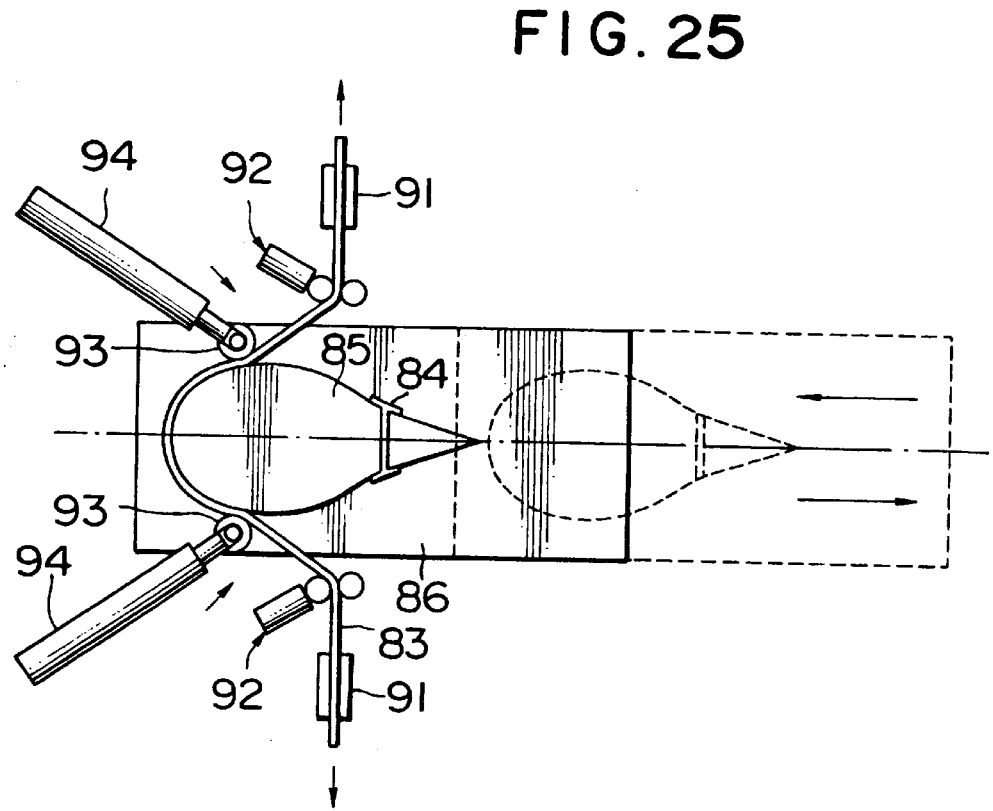
FIG. 25 is a schematic plan view showing a step succeeding the step shown in FIG. 24.

Next, as shown in FIG. 25, the mold 86 proceeds and comes into contact with the preform 83, the pressing rollers 93 press the preform 83 onto the outer side surface of the projected portion 85 of the mold 86, and thereby the preform 83 is bent along the projected portion 85.

Figure 26:
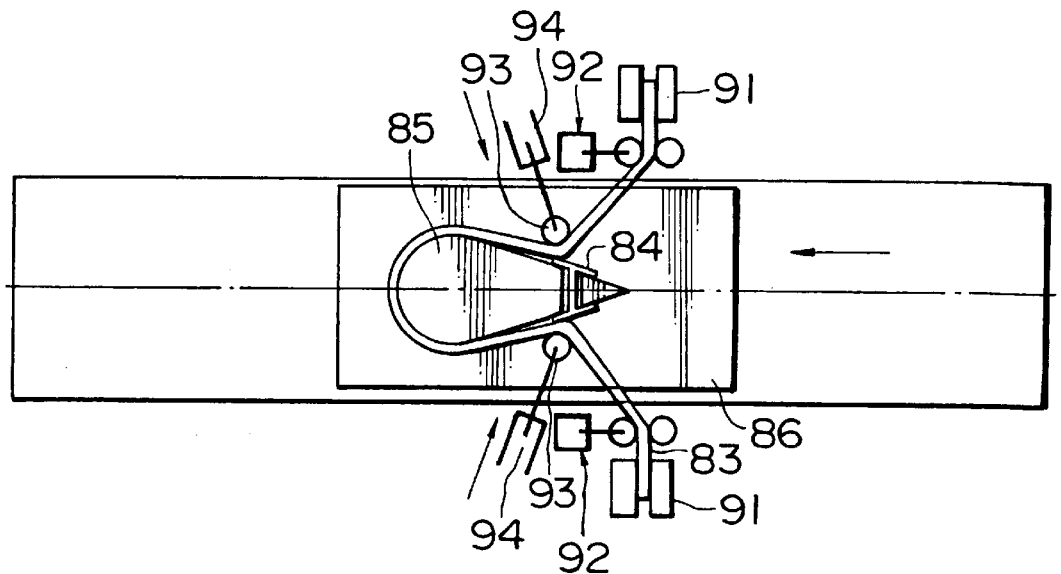
FIG. 26 is a schematic plan view showing a step succeeding the step shown in FIG. 25.

The mold 86 further proceeds, and as shown in FIG. 26, the pressing rollers 93 press the preform 83 onto the yoke portion preform 84 disposed on the yoke portion setting position and bond the preform 83 to the yoke portion preform 84.

Figure 27:
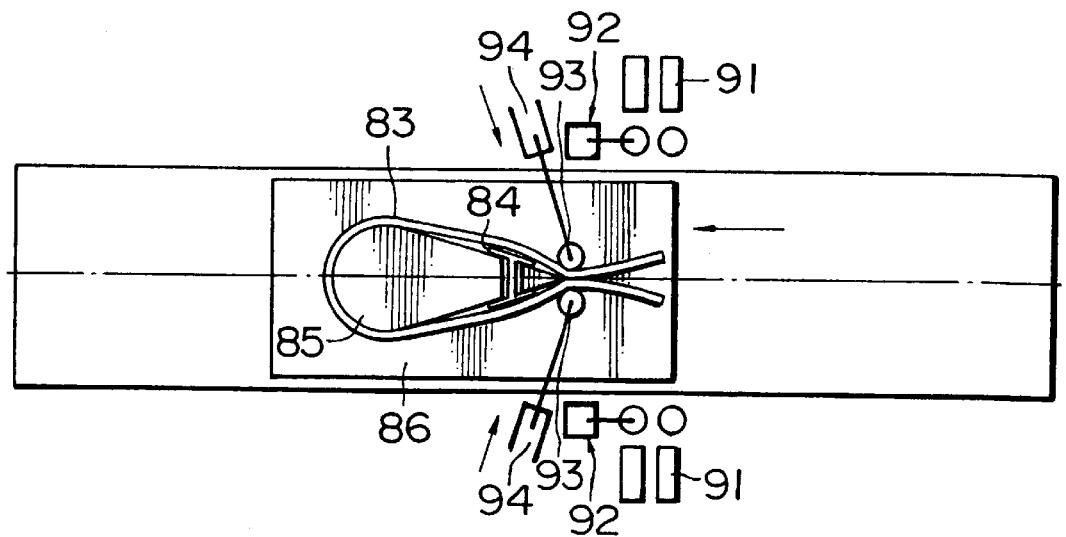
FIG. 27 is a schematic plan view showing a step succeeding the step shown in FIG. 26.

Then, as shown in FIG. 27, the preform 83 is overlapped at the root portion of the grip portion, and after the root portion of the grip portion is bonded strongly by pressing operation by the pressing rollers 93, the pressing force of the pressing rollers 93 is reduced by a pressing force switching mechanism (not shown).

Figure 28:
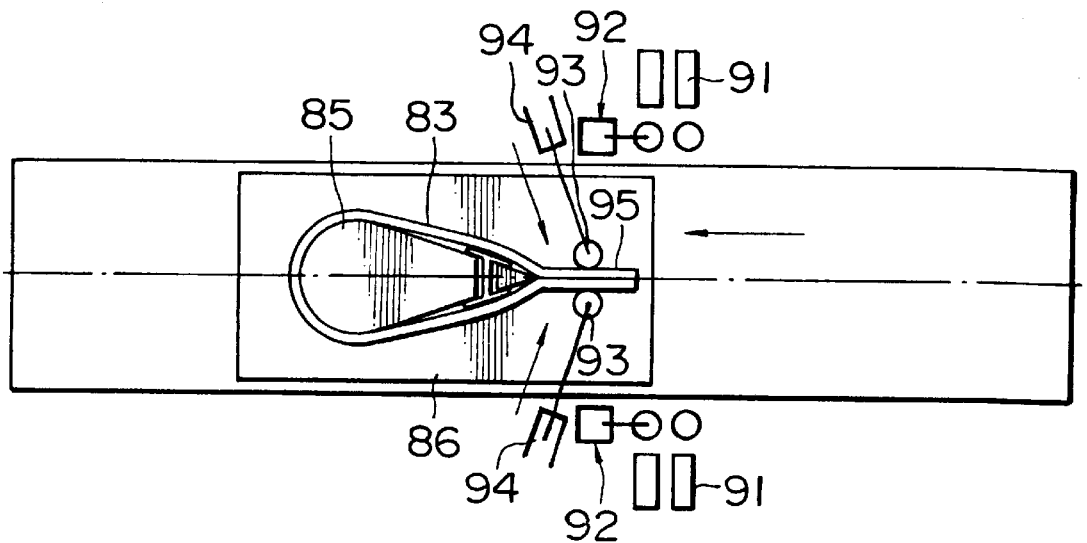
FIG. 28 is a schematic plan view showing a step succeeding the step shown in FIG. 27.

The mold 86 further proceeds, and as shown in FIG. 28, the preform 83 moves while nipped by the pressing rollers 93, and thus the grip portion is bonded and formed.

Figure 29:
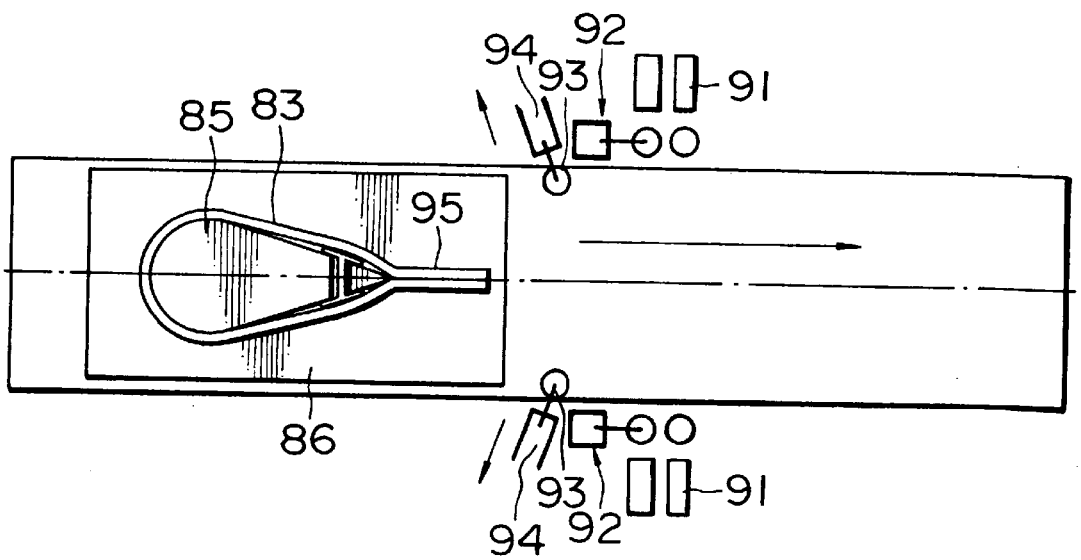
FIG. 29 is a schematic plan view showing a step succeeding the step shown in FIG. 28.

The mold 86 stops when it reaches a stroke end (FIG. 29). After the preform 83 is taken off from the mold 86, the mold 86 returns to the initial position in the direction shown by the arrow. The formed preform is reinforced by winding a prepreg on the bonded portions by hand, and thereafter, the preform is introduced into the metal mold to be pressed, heated and molded.

In the above process, the pressing force of the pressing rollers 93 is switched by a switching mechanism (for example, switching of a driving pressure of the air cylinders). This is for controlling the pressing force of the rollers stronger up to the grip bonding step to prevent generation of wrinkles of the preform 83 and to bond the yoke portion 84 stronger, and for controlling the pressing force of the rollers weaker at the grip bonding step to prevent the root portion of the grip portion from delaminating by the tension.

The attachment angle of the air cylinders 94 for the pressing rollers 93 is preferably in the range of 45 to 90 degrees relative to a machine axis 96 for the purpose of prevention of generation of wrinkles at the top portion and the vicinity and increase of the bonding force of the yoke portion and the grip portion. When the angle is changed to 45 degrees, 75 degrees and 90 degrees and compared with each other, in the condition of 45 degrees, the force of the pressing rollers 93 in the direction pressing the preform 83 onto the mold does not operate sufficiently at the yoke portion and the grip portion. In the condition of 90 degrees, because the initial position of the pressing rollers 93 for pressing the preform 83 retreats, the rollers cannot function for preventing the generation of wrinkles on the inside of the preform at the top portion. Therefore, the angle is the most preferably in the range of 70 degrees to 80 degrees for prevention of wrinkles at the top portion and increase of the bonding force of the yoke portion and the grip portion.

A pair of tension holding mechanisms 92 are disposed on the preform setting portion symmetrically relative to the machine axis 96 (machine center line).

The mold 86 has a structure in which the projected portion 85 having a shape corresponding to the shape of a frame of a racket (an oval-shaped portion corresponding to a shape of a gut surface and a triangular portion of the yoke portion through the root portion of the grip portion) is projected on a rectangular plate. As shown in FIG. 23, the H-shaped yoke portion preform 84 can be set between the oval-shaped portion and the triangular portion.

The mold 86 is positioned on the machine axis of the machine, and it moves on the machine axis from a position in front of the preform setting position to a stroke end position terminating the forming of the preform. Although the drive of the mold is carried out by transforming the rotational motion of a motor to a linear motion using a ball screw, another driving method may be applied. The surface of the mold 86 contacting the preform 83 is preferably treated with an adhesion resistant treatment (for example, Teflon coating). If not treated, there is a fear that it becomes difficult to take the preform 83 off from the mold 86 after forming and the form of the preform is broken.

Figure 30:
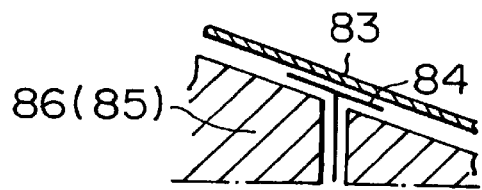
FIG. 30 is a schematic plan view of a yoke portion at the preform formation.

Although the yoke portion and the vicinity are recessed in an actual racket frame, if the yoke portion in the preform forming were formed in such a recessed shape, a tension is applied to the preform 83 in the portion and there is a fear that the preform 83 and the yoke portion preform 84 having been bonded to each other are delaminated from each other. Therefore, it is preferred that the shape of the mold is slightly changed from the shape of the actual racket frame and the yoke portion and the vicinity is formed linearly (FIG. 30) or formed to slightly protrude outward. As long as each bonding portion is precisely formed, there is no problem in a slight difference between the curvature of the mold and the curvature of the actual racket frame.

The pressing force of the pressing rollers 93 can be switched, for example, by switching the driving pressure of the air cylinders 94 using an electromagnetic valve (not shown).

In the above-described automatic forming machine and the process, even in a preform having a relatively high stiffness at a room temperature (25–35° C.), it is possible to fit the preform to the mold while pulling the both end portions of the preform at a strong force by the tension holding mechanisms and to prevent generation of wrinkles on the inside of the preform.

Further, generation of wrinkles on the inside of the preform can be prevented by forming the preform while pressing the preform to the mold by the pressing rollers, and further the bonding of the yoke portion and the grip portion can be performed in a good condition.

Furthermore, stabilization of the quality, increase of the yield, shortening of the forming time, labor saving, increase of the working efficiency, etc., become possible.

Next, the process for producing an FRP curved pipe or racket according to the present invention will be explained.

The process for producing an FRP curved pipe or racket according to the present invention comprises the steps of placing a preform, formed by covering an expansive tube with a prepreg of reinforcing fibers and disposed on a high pressure-resistance tube, in a cavity of a mold; heating the mold as well as the preform; and pressing the preform to an inner wall surface of the cavity by pressurizing the inside of the high pressure-resistance tube at a pressure of not lower than 3 MPa.

In the process, it is preferred that a non-woven fabric having a single fiber diameter of not greater than 20 $\mu$m and a weight per unit area of not greater than 100 g/m$^2$ is wound around the preform.

Although such a process is a kind of so-called internal pressure molding, because the applied pressure is not lower than 3 MPa and is high, particularly it is called "high-pressure molding" in the present specification.

Namely, as described in the "Background Art of the Invention", the conventional process has used mainly a compressible fluid (for example, air) and performed as an internal pressure molding at a relatively low pressure. In the above-described high-pressure molding according to the present invention, for example, a high pressure-resistance tube, of which one end is closed and to the other end of which a joint is connected for introducing a pressurized medium of an incompressible fluid from an external pressurization apparatus, is used, the high pressure-resistance tube is expanded in a condition of no leakage, and the preform is pressed to the inner wall surface of the cavity for molding.

Such a process is performed using the following apparatus. Namely, the apparatus for producing an FRP curved pipe or racket according to the present invention comprises a mold having a cavity in which a preform formed by covering an expansive tube with a prepreg of reinforcing fibers and disposed on a high pressure-resistance tube is placed; and means for supplying a pressurized medium of an incompressible fluid having a pressure of not lower than 3 MPa into the high pressure-resistance tube.

The high pressure-resistance tube is preferably composed of a material which has a high thermal resistance where a strength causing no breakage by a force applied in molding can be maintained even if it is heated at a temperature for curing a thermosetting resin. Concretely, it is preferably a silicone rubber or a fluoro-rubber having a hardness of not more than 80 in JISA, and more preferably a silicone rubber tube having a hardness of about 40 in JISA in order to obtain a sufficient elongation. The sectional shape of the high pressure-resistance tube is preferably a shape close to the sectional shape of a molded product if possible, because such a condition is convenient for taking off the high pressure-resistance tube after molding. The size of the outer shape is preferably a size in which the high pressure-resistance tube can be easily taken off from a molded product after molding, concretely a size of about 50–80% of the cross-sectional area defined by the inner wall of the mold in consideration of the critical elongation of the high pressure-resistance tube.

As the method for closing one end of the high pressure-resistance tube, except a method for forming the one end in a closing condition at the time of the production, a method for closing by bonding, a method for closing one end of a high pressure-resistance tube having opened both ends with, for example, a wire, and a method for setting a high pressure-resistance tube in a mold in a bent condition and closing the end by a pressing force of the meeting surface of the mold, can be employed. On the other hand, in the other end of the high pressure-resistance tube, it is preferred that the caulked portion of the high pressure-resistance tube is formed in a duplex tube structure to increase the rigidity of the portion as well as the thickness of the high pressure-resistance tube after caulking is controlled to 40–70%, more preferably 50–60% of the thickness before caulking. As a reinforcing material for forming such a duplex tube structure, for example, a silicone rubber, a fluoro-rubber, a hard rubber and a metal braid are preferred.

As the incompressible fluid to be charged into the high pressure-resistance tube, a fluid, which is not vaporized at a curing temperature of a thermosetting resin and does not deteriorate in properties even during use for a long period of time, is preferable. Concretely, for example, an oil such as a turbine oil or a silicone oil can be used, and among these oils, a turbine oil is preferred from the viewpoints of low cost and easy getting. The inside of the high pressure-resistance tube is pressurized up to a pressure of at least 3 MPa, preferably 7–10 MPa, using any of these incompressible fluids. The reason of pressurization to such a pressure, particularly to a pressure of at least 3 MPa, is based on the observation test after painting on recessed portions of a surface which was carried out by the inventors. Namely, recessed portions were formed on a surface of an aluminum plate at a pitch of 0.1 mm by pressing thereon a needle having a diameter of 0.1 mm to 1.0 mm, and when the size of the recessed portions after painting the surface of the aluminum plate was determined by observation, almost no affection was given to the surface quality in the case of a diameter of not more than 0.3 mm, but the boundary was present at a diameter of 0.4 mm, and when the diameter became 0.5 mm, a defect could be observed. From this test, a pressure "p" required to compress a diameter of 0.5 mm of a defect down to a diameter of 0.3 mm is expressed by the following equation.

$$p/p_0 = (0.5/0.3)^3$$

If the "$p_0$" is a conventional molding pressure of about 0.7 MPa, a pressure of at least about 3 MPa is required for the pressure "p". On the other hand, the upper limit of the pressure is not particularly restricted, and the pressure is preferred to be higher from the viewpoint of prevention of surface defects, but the upper limit is about 15 MPa from the viewpoint of practical use.

An embodiment of the above-described process and apparatus will be explained in reference to the drawings.

Figure 31:
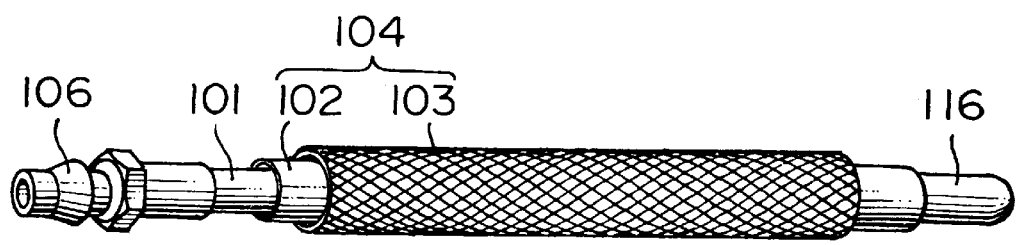
FIG. 31 is a perspective view of a molding base material according to an embodiment of the present invention.

FIG. 31 is a perspective view showing the whole of a high pressure-resistance tube 101 used in the process according to the present invention. The figure shows a state where the high pressure-resistance tube 101 is inserted into an expansive tube 102 and a prepreg 103 of reinforcing fibers is wound around the expansive tube 102. A preform 104 is formed by winding the prepreg 103 around the expansive tube 102.

When the process according to the present invention is carried out, firstly the state shown in FIG. 31 must be made as preparation of the process. The concrete method for the preparation is as follows.

A core material such as a wood, bamboo or plastic material (not shown) is inserted into the expansive tube 102 composed of, for example, polyamide. Then, the prepreg 103 having been impregnated with a thermosetting resin such as an epoxy resin or a phenolic resin selected depending upon the use of a molded product is wound around the expansive tube 102 by predetermined times, and thereafter, the core material is taken off and the high pressure-resistance tube 101 is inserted.

Figure 32:
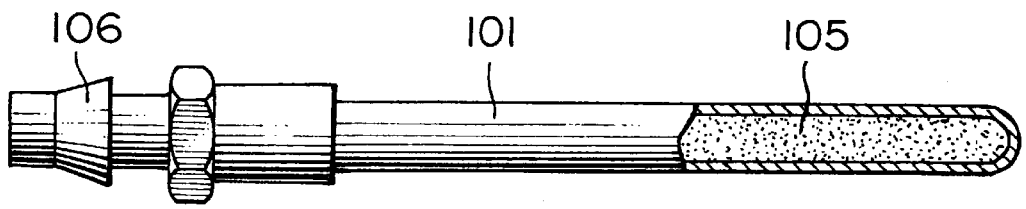
FIG. 32 is a side view partially showing as a sectional view of a high pressure-resistance tube shown in FIG. 31.

As the whole of the high pressure-resistance tube 101 is shown in FIG. 32, it is prepared by cutting a silicone tube, closing the right end thereof by bonding, and connecting a male-side joint 106 of a one-touch coupler sold on the market to the left end thereof so that it can be connected to an external pressurizing apparatus (not shown).

Next, steps for producing a hollow curved pipe, concretely a racket, using the high pressure-resistance tube 101 described above, referring to FIG. 33.

Figure 33:
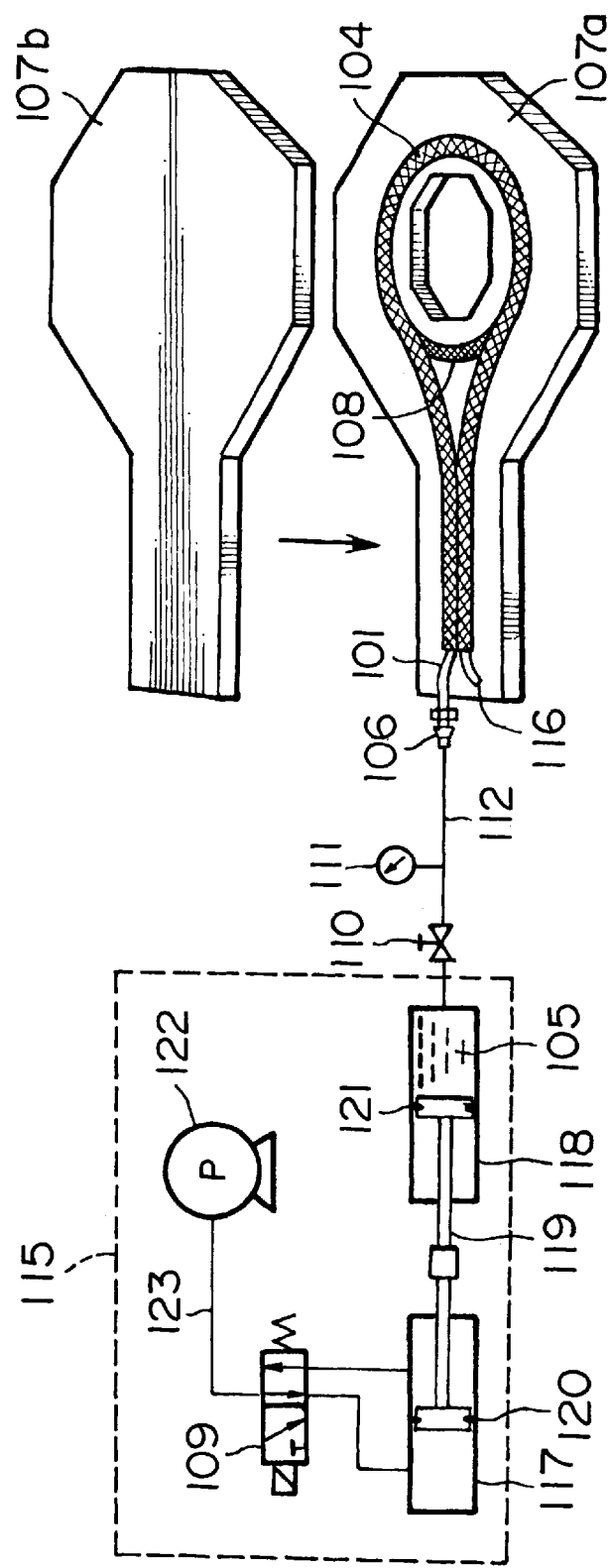
FIG. 33 is a schematic view showing a process for molding a racket using the base material shown in FIG. 31.

In FIG. 33, an external pressurizing apparatus 115 is connected to the male-side joint 106 attached to the high pressure-resistance tube 101 via a pressure-resistance hose 112, and it comprises a so-called dual-type cylinder/piston apparatus wherein pistons 120 and 121 fixed to the end portions of a single rod 119 are reciprocally moved in two hydraulic cylinders 117 and 118. In the pressurizing apparatus 115, when the pressurized oil prepared by a hydraulic pump 122 is charged into the cylinder 117 through a pipe 123 and a switching valve 109, the common rod 119 moves in the right direction, the oil 105 present in the cylinder 118 is charged into the high pressure-resistance tube 101 through a valve 110, the pressure-resistance hose 112 and the joint 106 by the piston 121, and thereby expanding the high pressure-resistance tube 101. When the high pressure-resistance tube 101 is taken off from the expansive tube 102, the common rod 119 is moved in the left direction in advance, and it is taken off after shrinkage. A pressure gauge 111 is provided for confirming the charged pressure.

As shown in FIG. 33, a mold 107 used comprises a lower mold 107a whose cavity is formed as a shape of a racket and an upper mold 107b to be fixed onto the lower mold. Firstly, after the preform 104 together with the high pressure-resistance tube 101 shown in FIG. 31 are set on the lower mold 107a as shown in FIG. 33 while bending them along the cavity of the lower mold 107a, a yoke 108 is set. One end of the high pressure-resistance tube 101 is protruded from the cavity and placed on the meeting surface of the lower mold, as shown in the figure. In this case, if the temperature of the mold has been maintained at 40–60° C. in advance, the setting becomes very easy because the prepreg 103 is softened. Then, the upper and lower molds 107a and 107b are integrated by closing the molds using a hot pressing machine (not shown), and at the same time, the tip portion 116 of the high pressure-resistance tube 101 is pressed and closed by the meeting surfaces of the molds. Thereafter, the oil 105 is supplied from the external pressurizing apparatus 115 for pressurization, and the preform 104 is expanded together with the expansive tube 102 in the cavity of the mold to be pressed to the inner wall surface of the cavity.

Then, after the resin is cured by heating the mold 107, the pressure is released by extracting the oil, and thereafter, a molded product is taken off from the mold 107. Finally, the high pressure-resistance tube 101 is taken off from the molded product to obtain an aimed FRP racket.

In such a process, because the molding can be performed in a condition of no leakage from the high pressure-resistance tube using an incompressible fluid generating an internal pressure much higher than the conventional pressure, an FRP curved pipe or racket excellent in quality and having no surface defect originating from insufficient pressing of the preform to the inner wall surface of the cavity can be produced.

Although the above process is explained as a so-called high-pressure molding, the FRP curved pipe or racket having a non-woven fabric layer according to the present invention can be produced even by a usual internal-pressure molding, that is, a process applied with a relatively low internal pressure.

Namely, the process for producing an FRP curved pipe or racket according to the present invention comprises the steps of placing a base material, formed by winding a non-woven fabric having a single fiber diameter of not greater than 20 $\mu$m and a weight per unit area of not greater than 100 g/m$^2$ around a preform formed by covering an expansive tube with a prepreg of reinforcing fibers, in a cavity of a mold; heating the mold as well as the base material; and pressing the preform to an inner wall surface of the cavity by pressurizing the inside of the expansive tube.

In the process, preferably the non-woven fabric is also made as a prepreg.

Even in such a process of a usual internal-pressure molding, by providing the above-described specified non-woven fabric layer, as aforementioned, good resin flowability and deaeration at the time of molding can be achieved, and a molded product good in surface quality and having no voids, pinholes and resin lack portions can be obtained.

In the above-described high-pressure molding or usual internal-pressure molding, it is preferred to use a split mold which includes a core constructed dividably. Namely, the apparatus for producing a curved pipe or racket of fiber reinforced plastics material according to the present invention comprises a split mold having upper and lower molds and a cavity in which a preform formed by covering an expansive tube with a prepreg of reinforcing fibers is placed; means for supplying a pressurized medium into the expansive tube; and a core constructed dividably and provided in the lower mold. Such an apparatus can be applied also to an RTM process described next.

The FRP curved pipe or racket according to the present invention also can be produced by so-called resin transfer molding (hereinafter, also referred to as "RTM process") wherein reinforcing fiber materials are wound on the periphery of an expansive tube and after it is set in a mold, a resin is injected.

Namely, the process for producing an FRP curved pipe or racket according to the present invention comprises the steps of placing a base material, formed by winding a non-woven fabric having a single fiber diameter of not greater than 20 $\mu$m and a weight per unit area of not greater than 100 g/m$^2$ around a preform formed by covering an expansive tube with reinforcing fibers, in a cavity of a mold; heating the mold as well as the base material; pressurizing the inside of the expansive tube; and injecting resin into the cavity while reducing the pressure in the cavity.

More concretely, in this process, for example, a preform formed by preparing a tubular reinforcing fiber material and disposing an expansive tube therein is set in a mold heated at a molding temperature, while the expansive tube is pressurized as well as the pressure of the cavity is reduced, a resin is injected into the cavity at an injection speed of 1–7 g/sec. and an injection pressure of 0.2–1.5 MPa, and the resin is cured in a time of not more than 20 minutes.

In this process, the preform is preferably formed by filament winding or formed as a braid, and a preform disposing an expansive tube as the inner layer thereof is used. Such a preform is set in a lower mold having a cavity formed as a desired shape of a curved pipe, for example, a shape of a racket, while bending the preform. At that time, one end of the expansive tube is closed by, for example, binding as well as a coupler for introducing a pressurized medium such as a pressurized air is attached to the other end, for the pressurization of the inside of the expansive tube at a later step. Then, an upper mold is closed, and while the pressurized air is introduced into the expansive tube, the resin is injected.

To heat the mold set with the preform at a temperature near the molding temperature in advance is advantageous for shortening the molding cycle and reducing the cost for the molding, and for reducing the viscosity of the resin and improving the property for impregnation of the resin. Further, the impregnation of the resin into the preform and the surface quality of a molded product can be improved by reduction of the pressure in the cavity of the mold in which the preform is set in the lower mold and the upper mold is closed. As the method for the pressure reduction, either a method for injecting a resin while vacuuming the cavity by a vacuum pump or a method for vacuuming the cavity by a vacuum pump and then closing the vacuum port of the mold and injecting resin into the cavity maintained in a condition of a reduced pressure, can be employed.

As the resin, a thermosetting resin such as an epoxy resin, an unsaturated polyester resin, a vinylester resin or a phenolic resin can be used. The viscosity of such a resin is preferably not less than 0.05 Pa·S and not more than 1 Pa·S at a temperature condition of the injection. If the viscosity is more than 1 Pa·S, the impregnation property and the handling ability reduce because the flow resistance due to the molding base material becomes large at the time of injection. If the viscosity is less than 0.05 Pa·S, there is a fear that it causes a leakage of the resin from the mold and it is not preferred.

The time for the above-described injection of the resin is preferably not more than 5 minutes. If more than 5 minutes, the curing reaction of the injected resin proceeds and the viscosity of the resin becomes high. As the method for the resin injection, continuous injection and discontinuous injection can be both available. In the case of discontinuous injection, the injection time is defined as the time from beginning of the injection until the finishing of the injection. The pressure for the resin injection is preferably in the range of 0.2 to 1.5 MPa. Further, to elevate the pressure in the expansive tube up to 0.5–1.5 MPa at the time of molding is advantageous for drawing out an excessive amount of resin and increasing the content of the reinforcing fibers and for increasing the uniformity of the thickness and obtaining a curved pipe more excellent in properties.

As the preform, for example, a preform formed by filament winding or a preform formed as a braid is used. In a preform formed by filament winding, after an expansive tube (for example, a rubber tube or a nylon tube) is coated on a mandrel as needed, a bundle of reinforcing fibers (for example, a bundle of carbon fibers, glass fibers or polyaramide fibers) is wound helically around the mandrel by filament winding so that the winding direction is set in a direction of ±7–75 degrees relative to the axial direction of the mandrel to form a helically wound layer having an appropriate thickness. The bundle of reinforcing fibers may be formed as either a strand formation or a tape formation. If the winding angle is less than 7 degrees, the stability of arrangement of the bundle of reinforcing fibers decreases. If the winding angle is more than 75 degrees, the binding force increases and taking off of the mandrel at a later step becomes difficult. Further, the bundle of reinforcing fibers is wound preferably while being applied with a tension of 50–200 g. Furthermore, the braid is formed by braiding the above-described bundle of reinforcing fibers in a form of a tube, and the preform is formed by coating the braid on the expansive tube so that the thickness becomes a predetermined thickness. In this case, the braiding angle of the braid is set such that the bundle of reinforcing fibers is arranged at an angle of ±5–45 degrees in a state where the expansive tube is expanded in a cavity by applying a pressure.

When the above-described preform is set in the cavity of the lower mold, a material of reinforcing fibers such as a cloth may be additionally set to partially reinforce and increase the stiffness. In particular, a product such as a tennis racket in which a gut is stretched, the reinforcement of a portion around a gut hole is preferred to prevent breakage of the gut hole. Further, in a connecting portion of a racket frame and a yoke portion or a joint portion of two preform portions present between the frame and a grip portion, the surface of a molded product is likely to deteriorate because of an occurrence of a disorder of the preform. Also in this portion, it is preferred that a material of reinforcing fibers such as a cloth is additionally wound.

With respect to the thermal resistance of the molded product, the glass transition temperature "Tg" is preferably not less than 120° C. This is for preventing a deformation under a condition of a high temperature.

In the above-described RTM process, usually, in order to impregnate an injected resin into a preform sufficiently, a low-viscosity resin is generally used as the resin to be injected. However, if the viscosity is low, there is a fear that leakage of the resin from the parting line of the mold is likely to occur. Such a leakage of the resin at the time of injection causes not only a damage of the quality of the molded product but also a deterioration of the working environment. Further, although the reduction of the pressure in the cavity at the time of resin injection is advantageous for improving the impregnation property of the resin and enabling to decrease the pressure of the injection, if the sealing ability at the parting line of the mold or at the injection port is poor, the outside air leaks into the cavity and it causes the generation of voids.

Accordingly, it is preferred that a mold with no leakage of a resin, excellent in sealing ability at the time of pressure reduction and excellent in moldability and easiness of taking-off ability of a molded product from the mold is used. In order to satisfy this requirement, the apparatus for producing an FRP curved pipe or racket according to the present invention comprises a split mold having upper and lower molds and a cavity in which a preform formed by covering an expansive tube with reinforcing fibers is placed; means for supplying a pressurized medium into the expansive tube; means for reducing the pressure in the cavity; means for injecting resin into the cavity; and a core constructed dividably and provided in the lower mold. Further, a sealing material is preferably disposed around the cavity. Furthermore, a resin bank is preferably provided on one side or each side of the cavity.

Namely, by the structure of the split mold (upper and lower molds parting type mold) and the structure having the dividably constructed core in the lower mold, the moldability and easiness of taking-off ability of a molded product from the mold can be improved, and by disposing the sealing material, the leakage of the resin can be prevented and the sealing ability at the time of pressure reduction can be improved. Further, by providing the resin bank, the air present in the cavity moves into the resin bank together with the resin, and the voids in the resin subjected to the molding can be reduced and the generation of the defects such as voids can be prevented.

For example, the mold is constructed as an upper and lower molds parting type mold, the resin injection port and the pressure reducing port are provided totally at two or more positions, and a single port for injecting a pressurized gas, for example, a pressurized air, into the expansive tube disposed in the cavity is provided on one end of the curved pipe. A continuous sealing material is preferably disposed around the cavity of this mold. The sealing material is preferably constructed from a silicone rubber or a fluororubber resistant to a high temperature of about 150° C.

It is preferred that the resin injection port and the pressure reducing port are provided totally by a number of not less than two. Any of these ports is preferably provided in a form having a slit communicating with the cavity so as to leave no conspicuous traces on the surface of the molded product. The resin injection port and the pressure reducing port can be changed to each other depending upon the condition. Further, if there are three or more ports, it is possible to optimize the molding condition by using an appropriate combination of the ports.

The resin bank is provided preferably on a portion present from the resin injection port and the pressure reducing port to the cavity. A slit gate is provided between the resin bank and the cavity, and a resin is injected from the gate or the pressure is reduced through the gate. Because the pressure reducing port functions also as a port from which the injected resin escapes, the resin bank for the pressure reducing port is preferably a bank similar to the resin bank for the resin injection port. By providing such resin banks, slit gates can be easily provided on the paths communicating with the cavity and it becomes possible to leave no conspicuous traces of the gates on the surface of the molded product. Preferably a draft with an angle of 3–15 degrees is provided on the resin bank so that the resin is taken off together with a mold at the time of mold opening. A plug attached to the resin injection port or the pressure reducing port preferably has a sectional shape which is possible to transmit a shearing force to a cured resin and thereby cut the cured resin by twisting by rotating the plug after curing the resin.

In the curved pipe according to the present invention, preferably a port for injecting a compressed gas for applying an internal pressure is provided on the end of the curved pipe, for example, a portion corresponding to a grip portion in a case of a racket. If such a structure is provided, a sealing condition can be easily realized wherein the pressure reducing state is maintained at a gauge pressure of not more than −61,000 Pa for a time of not less than 3 minutes under a condition without vacuuming by a vacuum pump and without injecting resin. If the time is within 3 minutes, bubbles are likely to be involved at the time of resin injection, thereby reducing the surface quality and the resin impregnation property.

Figure 34:
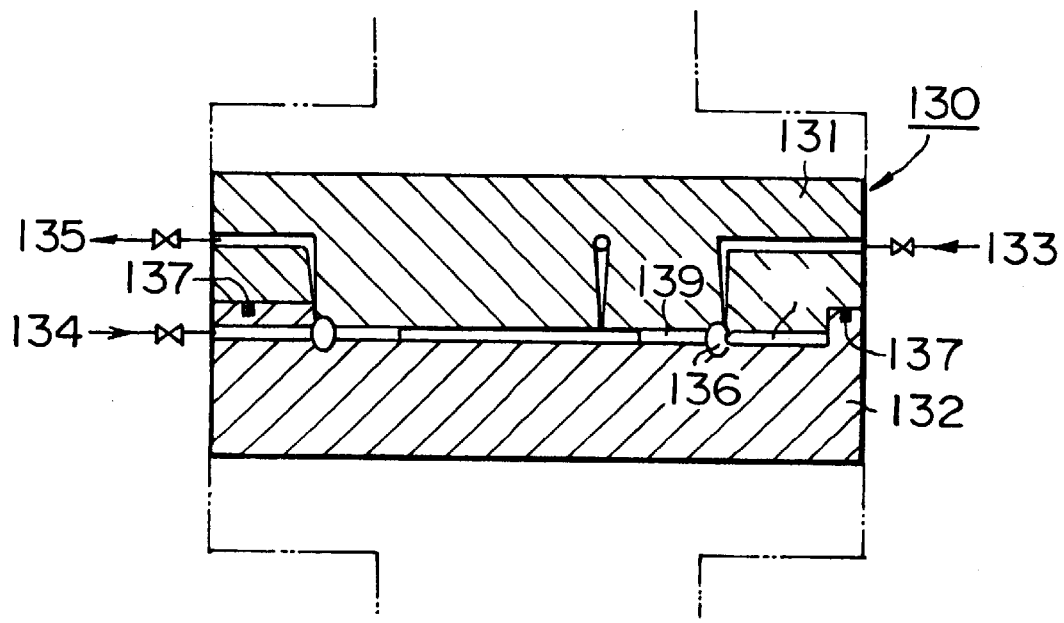
FIG. 34 is a schematic vertical sectional view of an apparatus for producing an FRP racket according to an embodiment of the present invention.
Figure 35:
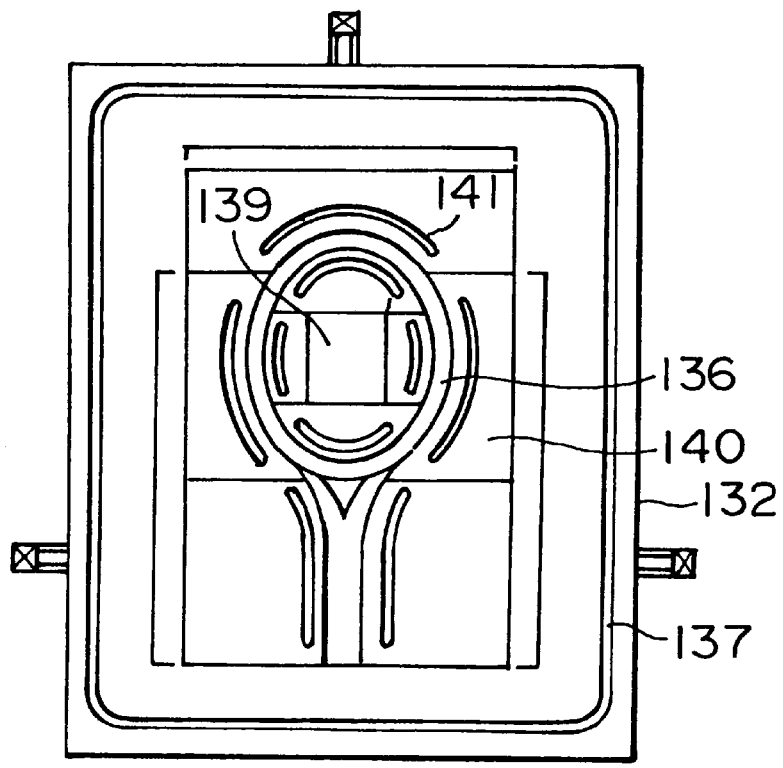
FIG. 35 is a plan view of a lower mold of the apparatus shown in FIG. 34.

To explain more concretely referring to the drawings, FIGS. 34 and 35 show a mold 130 comprising an upper mold 131 and a lower mold 132, and a resin injection port 133, an air supply port 134 and a pressure reducing port 135 are provided thereon. An O-ring 137 for sealing is disposed around the periphery of a cavity 136 to seal the mold 130. In order to give a high sealing ability, the sealing material 137 must surround the cavity 136 with no slit.

Totally three or more ports are provided for the resin injection port 133, the air supply port 134 and the pressure reducing port 135, and the resin injection port and the pressure reducing port can be changed to each other. The pressure reducing port 135 can function also as a resin escaping port.

Figure 36:
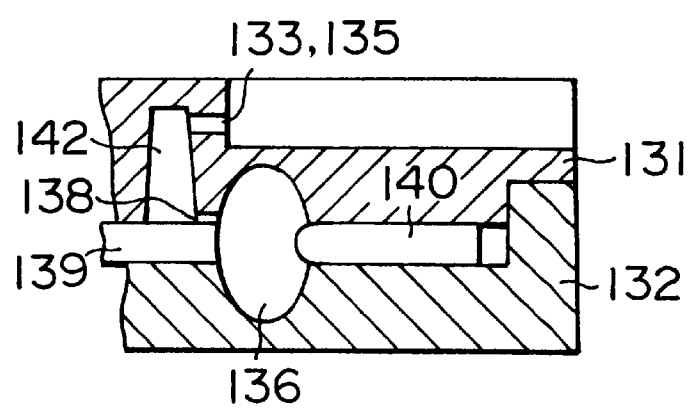
FIG. 36 is an enlarged sectional view of a resin inlet port and the vicinity of the apparatus shown in FIG. 34.

The resin injection port 133 and the pressure reducing port 135 are constructed, for example, as shown in FIG. 36, and they are communicated with the cavity 136 through a slit gate 138. A core 139 (a placed core) set at a predetermined position and a sliding core 140 are provided in the mold. The sliding core 140 is disposed at a position of the outer side of the cavity 136, and it is provided for taking off an undercut portion (a gut groove portion of a tennis racket) from the mold and for putting a base material with a large bulk in the mold so as not to be engaged.

As the resin bank for escaping bubbles, a resin bank 141 for an overflow resin is provided on one side or each side of the cavity 136. The resin overflowing after resin injection can be stored in the resin bank, and because the resin overflows together with the bubbles, voids on the molded product can be decreased.

Further, as shown in FIG. 36, it is advantageous that a resin bank 142 for the gate is provided at a portion from the resin injection port and the pressure reducing port to the gate. A plug for injection can be easily attached to the injection port 133 of the slit gate type by providing the resin bank 142. Further, even if the injection pressure of the resin supplied from outside varies, the variation is absorbed and it is hardly transmitted to the cavity 136. Because a draft is provided to the resin bank 142 as shown in the figure, the resin present therein can be easily removed.

Figure 37:
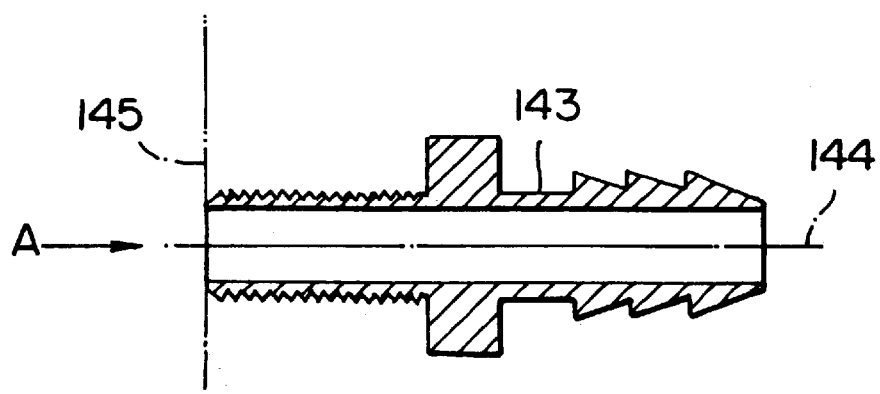
FIG. 37 is an enlarged sectional view of a plug of a resin inlet port and a pressure reducing port of the apparatus shown in FIG. 34.
Figure 38:
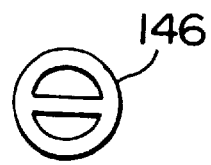
FIG. 38 is an elevational view showing a desired example of a shape for an opening portion of the plug shown in FIG. 37.

A plug 143 such as one shown in FIG. 37 is used for the resin injection port 133 and the pressure reducing port 135. The cured resin in the plug 143 and the cured resin in the resin bank are twisted and cut from each other by a shearing force. The plug 143 is rotated around a center axis 144 thereof, and the cured resin is twisted and cut by a shearing force generating on a plane 145. In order to easily generate this shearing force, the shape of the plug viewed from the A direction in FIG. 37 is formed as a shape shown in FIG. 38. Such a shape 146 may be formed only on the end portion of the plug, and may be applied over the entire length of the plug.

Figure 39:
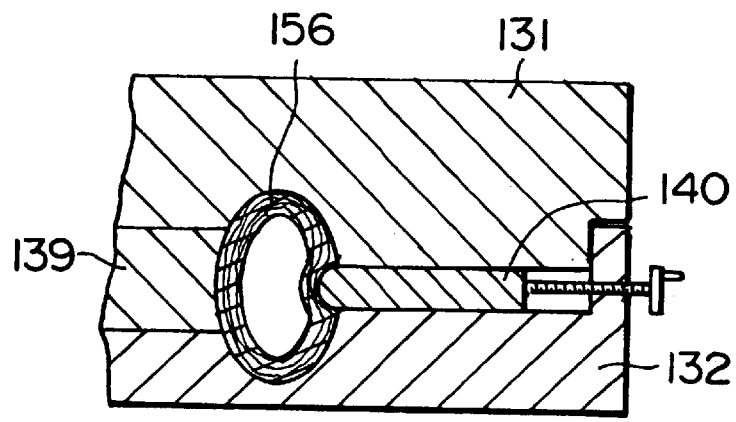
FIG. 39 is an enlarged sectional view of a core portion of the apparatus shown in FIG. 34.

Further, the relationship between the sliding core 142 and placed core 139 is set as shown in FIG. 39, and a preform 156 is put in the cavity 136 so as not be engaged in the mold in an improper condition as well as it is possible to easily take even an undercut portion (gut groove portion) off from the mold.

The FRP curved pipe or racket according to the present invention can be molded also by a process for discharging excessive resin and air present in a cavity naturally at the time of molding.

For example, it is a process wherein a base material formed by winding a prepreg around the periphery of an expansive tube and winding a non-woven fabric having a single fiber diameter of not greater than 20 μm and a weight per unit area of not greater than 100 g/m² around the prepreg is placed in a cavity of a mold, and the mold is heated as well as the base material is expanded and pressed to an inner wall surface of the cavity by pressurizing the inside of the expansive tube, thereby discharging excessive resin and air present in the cavity out from the cavity. Also in this process, the layer of the non-woven fabric is preferably prepared as a prepreg in advance.

Further, such a process can be carried out by the following apparatus.

For example, it is an apparatus comprising a mold having a cavity in which a preform formed by winding a prepreg around the periphery of an expansive tube or a base material formed by winding a non-woven fabric on the prepreg wound around the expansive tube is set; means for supplying a pressurized medium into the preform or the base material; and a slit-like discharge path provided in the mold and communicating with the outside of the mold for discharging an excessive resin of the preform or the base material and an air present in the cavity out from the cavity.

Figure 40:
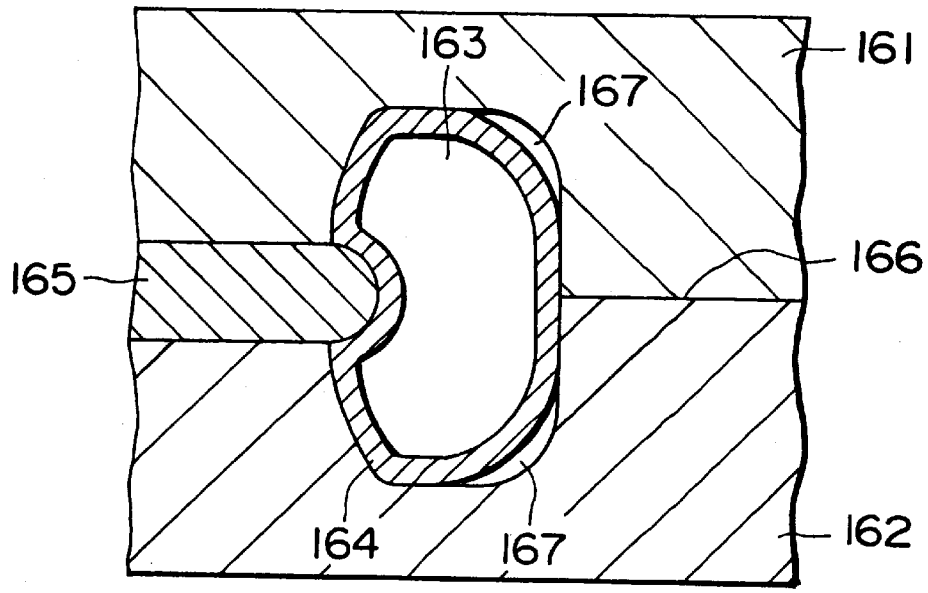
FIG. 40 is a partial vertical sectional view of a mold showing a conventional molding process.

Such process and apparatus are applied for solving the following conventional problems. Namely, in the conventional technology, for example, as shown in FIG. 40, a preform 164 is set in a cavity 163 formed by an upper mold 161 and a lower mold 162, and in the case where a sliding core 165, etc. is disposed and internal pressure molding is carried out (166: meeting surface), because a relatively low pressure (for example, a compressed air of 0.8 MPa) is applied, an insufficient adhesion of the preform 164 to the inner wall surface of the cavity occurs, and there occurs a case where air present in the cavity cannot escape completely (insufficient adhesion portions 167 are generated). Such an insufficient adhesion causes surface defects (for example, generation of unnecessary recessed portions) and generation of voids. Further, such defect portions are generated characteristically depending upon the shape of the hollow pipe and the mold. Namely, they are likely to occur at specified portions.

Figure 41:
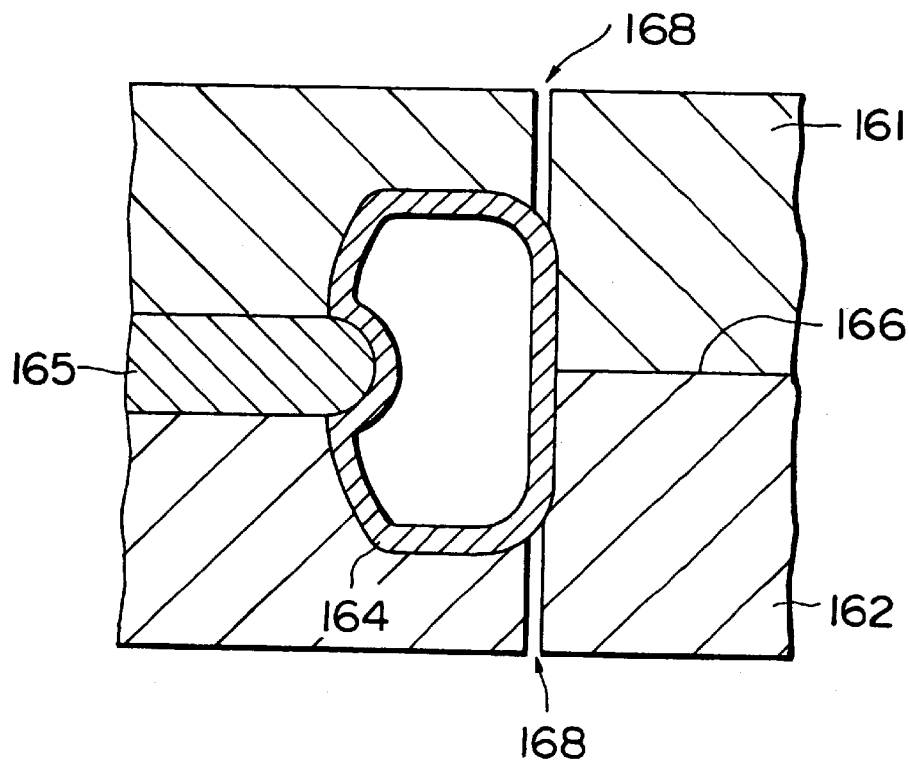
FIG. 41 is a partial vertical sectional view of a mold according to an embodiment of the present invention.
Figure 42:
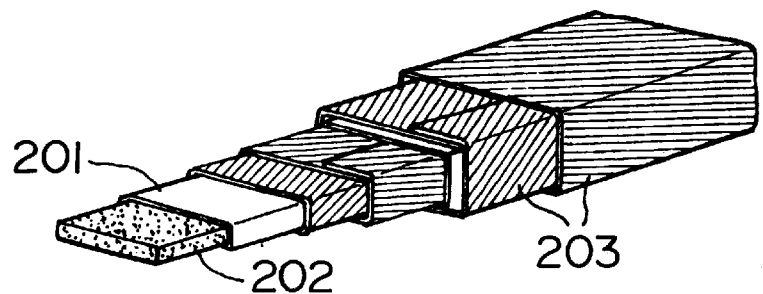
FIG. 42 is a partial perspective view of a conventional preform.

Accordingly, as shown in FIG. 41, by providing slits 168 on the portions where defects are likely to be generated based on non-discharge of air, the air trapped on the portions can be conveyed to a portion, in which the air gives no bad affection to a product to be molded, (for example, outside of the mold) together with the resin flow, thereby improving the adhesion property.

The width of the slit 168 is preferably in the range of 0.3 to 0.7 mm. If less than 0.3 mm, the processing of the slit is difficult and the resin cannot flow easily. If more than 0.7 mm, a flash after molding becomes thick and finish processing becomes difficult, and further, reinforcing fibers are likely to get out through the slit 168. Further, although the slit may not be processed by punching, processing by punching is more preferable, because the divided part structure is better in working ability for cleaning the cured resin in the slit portion.

In the various processes for producing an FRP racket described hereinabove, various parts may be formed separately and the parts can be bonded to a molding base material for a frame.

For example, the advantages due to preforming of a grip portion is as follows. In the conventional process for forming a grip portion, the grip is formed smaller than a required size at the stage of molding of a frame, and at a step after the molding, the racket is set in another mold having the required grip size for molding the grip, a polyurethane is injected into the mold, and the required shape of the grip is completed by heating and foaming the injected polyurethane. In such a process, polyurethane of about 20–25 g is required in order to obtain a grip having a necessary hardness, and therefore, it greatly obstructs to produce a super light-weight racket, that is, a top-heavy type racket.

Further, there is an integral molding process in the conventional processes. This process is a process applied for producing a super light-weight racket. In the process, the grip portion formed in a mold for molding a frame is processed in advance into a required grip shape, and the shape required for the grip is obtained simultaneously with the molding of the frame. Although it is possible to make the racket more light-weight as compared with the above-described process applied with foaming of polyurethane, there is a defect that an impact at the time of hitting is likely to transmit directly to a player. Further, because it is formed in a hollow structures the stiffness and the strength thereof become problems in a case where a further light weight is required. Furthermore, many molds having different sizes must be prepared for every grip size.

Accordingly, as aforementioned, a grip is formed or processed into a required shape in advance, and it is set in a cavity of a mold together with the above-described preform and integrated with the frame. Although any material can be used for the grip, a wooden material (strong against compression, easy in processing, low in cost and good in impact absorbing property), particularly, a balsa material is preferred to achieve more light-weight.

For example, the inside of a grip preformed or processed into a required size is hollowed out, the above-described preform for molding a frame is inserted into the prepared grip and the prepared material is set in a mold, and by heating and pressurizing (internal pressure), the molding of the frame and the bonding of the frame and the grip can be carried out simultaneously. In this case, the grip may be a integral type or may be divided into a plurality of parts.

As explained in detail hereinabove, in the curved pipe and racket according to the present invention, since a specified non-woven fabric layer is disposed outside of the reinforcing fiber layer, a good resin flowability at the time of molding can be obtained as well as and the deaeration at the time of molding can be improved, and less surface defects such as voids and pinholes, excellent quality and good properties can be achieved.

Further, in the process and apparatus according to the present invention, an FRP curved pipe and racket excellent in surface properties and strength and stable in quality can be efficiently produced.

EXAMPLES

Concrete examples of the present invention will be explained hereunder.

Example 1, Comparative Example 1

A racket having a structure shown in FIG. 1 was molded. Using carbon fibers as the reinforcing fibers, a material prepared by making carbon short fibers having a single fiber diameter of 7 μm and a length thereof of 12 mm in a form of a non-woven fabric was used as the non-woven fabric of carbon fibers. The non-woven fabric of carbon fibers was impregnated with an epoxy resin so that the fiber weight content became 30% to prepare a prepreg. The weight per unit area of the prepreg of the non-woven fabric was 100 g/m². A nylon tube (an expansive tube) was coated on a plastic core material, and after 12 unidirectional prepregs of carbon fibers with a matrix resin of epoxy resin were wound thereon such that the carbon fibers were crossed at an angle of 60 degrees to prepare a preform, the above-described prepreg of the non-woven fabric was wound thereon by one layer. Then, the core material was taken off, the molding base material prepared was placed in a mold having a cavity with a shape of a racket, and it was heated and molded at 150° C. while a compressed air having a pressure of 0.8 MPa was injected into the expansive tube.

As a result, an excellent surface quality can be obtained so that a putty applying process, which had been required in the conventional technology, could be omitted. Further, when the weight of the racket and the fiber volume content in the case where the non-woven fabric of carbon fibers was not provided were indicated as 100 (Comparative Example 1), respectively, the racket according to the present invention had a value of 89 in weight and a value of 113 in fiber volume content, and thus, a light-weight and high fiber volume-content racket, that is, a high grade racket could be realized. Because of omission of putty applying process after molding, a cost down could be expected, and because of a high fiber volume content, a light-weight and high-strength racket could be efficiently provided.

Example 2

Reinforcing fiber partial layer material each prepared by cutting a prepreg being impregnated with an epoxy resin at a width of 38 mm and a length of 1750 mm, stacking the cut prepregs in a five-layer lamination structure and pressing the stacked prepregs were around a core material coated with a nylon tube (rectangular parallelopiped material having a cross section of 20 mm×3 mm) to obtain a preform as shown in FIGS. 2 and 3. The five lamination structure in both the partial layer materials 11 and 12 was shown in Table 1.

TABLE 1

|  | Reinforcing fiber | Orientation of fibers | Weight content of fibers |
| --- | --- | --- | --- |
| first layer | carbon fiber | 60° cross-stacking | 58% |
| second layer | glass fiber | 60° cross-stacking | 70% |
| third layer | glass fiber | unidirectional | 70% |
| fourth layer | carbon fiber | 60° cross-stacking | 58% |
| fifth layer | carbon fiber | unidirectional | 58% |

After the core material was taken off from the preform, the preform was disposed in the cavity of the mold having a shape of a racket, and while heated at about 150° C., it was pressure-molded by injecting a compressed air with a pressure of about 0.8 MPa into the nylon tube 14 (FIGS. 2 and 3) to mold 20 tennis rackets. As shown in Table 2, a racket with almost no voids and few resin lack portions and having a good surface quality could be obtained.

Comparative Example 2

Figure 43:
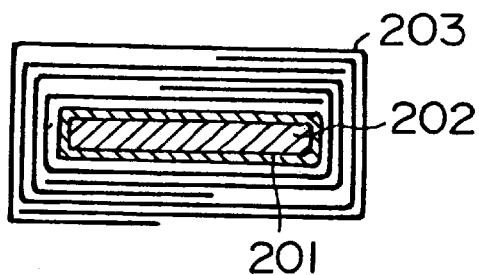
FIG. 43 is a sectional view of the preform shown in FIG. 42.
Figure 44:
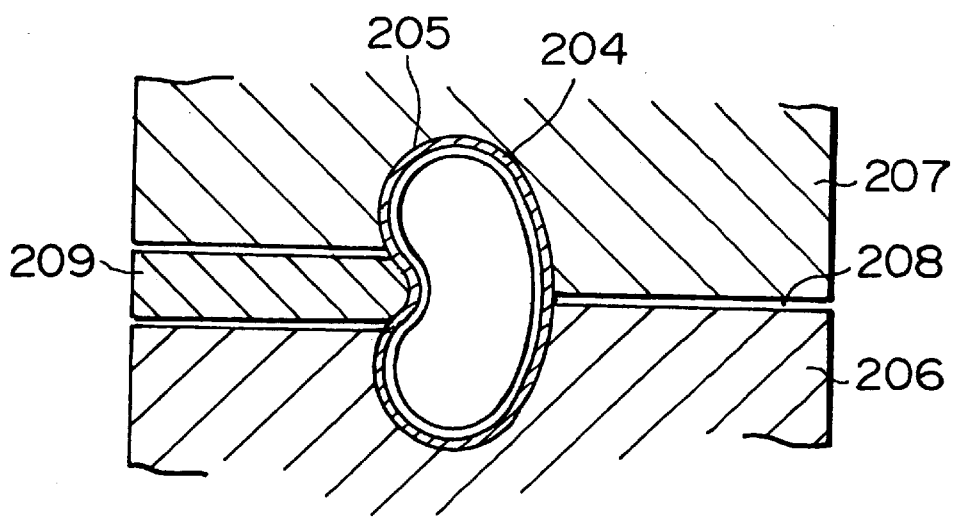
FIG. 44 is a partial sectional view of a mold showing a conventional process for molding a curved pipe.
Figure 45:
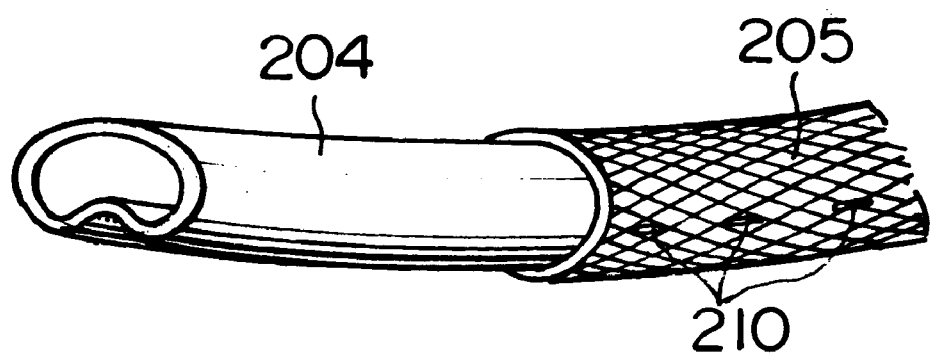
FIG. 45 is a partial perspective view of a conventional curved pipe on which surface defects have been generated.

Using a preform prepared by winding prepregs shown in Table 1 in a conventional manner of winding one layer by one layer shown in FIG. 43 in order ten times (two times of winding of the first layer through the fifth layer), 20 rackets were molded using a mold in a manner similar to that of Example 2.

The rackets molded in the above-described Examples 1 and 2 and the Comparative Example 2 were estimated with respect to surface quality and strength one by one. With the strength, head crunch strength, which is ordinarily used as a measure for determining a strength of a tennis racket, (a value of a load causing a crack when the load is applied from the head of the racket), was determined. The result obtained is shown in Table 2.

Example 3

Reinforcing fiber partial layer material each prepared by cutting a prepreg being impregnated with an epoxy resin at a width of 38 mm and a length of 1750 mm, stacking the cut prepregs in a five-layer lamination structure and pressing the stacked prepregs were around a core material coated with a nylon tube (rectangular parallelopiped material having a cross section of 20 mm×3 mm) to obtain a preform as shown in FIG. 5. The five lamination structure in both the partial layer materials was shown in Table 1, and the used reinforcing fibers were carbon fibers.

Figure 9:
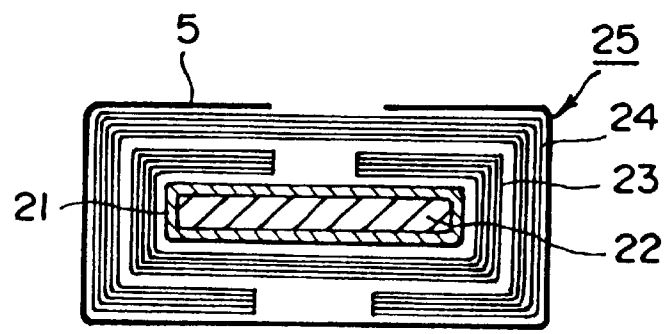
FIG. 9 is a cross-sectional view of a base material formed by providing a non-woven fabric on the preform shown in FIG. 5.

A preform comprising reinforcing fiber partial layer materials shown in FIG. 9 was used, and a material prepared by making carbon short fibers having a single fiber diameter of 7 μm and a length thereof of 12 mm in a form of a non-woven fabric was used as the non-woven fabric of carbon fibers, similarly to in Example 1. The non-woven fabric of carbon fibers was impregnated with an epoxy resin so that the fiber weight content became 30% to prepare a prepreg. The weight per unit area of the prepreg of the non-woven fabric was 100 g/m². The prepreg of the non-woven fabric was wound on the outermost layer of the preform, it was set in a mold and it was heated and molded at 150° C. while a compressed air having a pressure of about 0.8 MPa was injected into the tube.

20 rackets were molded in the above-described manner, and the result thereof on surface quality and strength is shown in Table 2. In this Example 3, the surface quality and strength both have almost no problem, and a good product could be obtained.

TABLE 2

|  | Surface quality | | | Strength | | |
| --- | --- | --- | --- | --- | --- | --- |
|  | ○ | Δ ~ ○ | × ~ Δ | 18 ~ 20 N | 16 ~ 18 N | 14 ~ 16 N |
| Example 1 | 15 | 4 | 1 | 3 | 12 | 5 |
| Example 2 | 16 | 3 | 1 | 6 | 11 | 3 |
| Example 3 | 18 | 2 | 0 | 10 | 10 | 0 |
| Comparative Example 2 | 5 | 10 | 5 | 4 | 9 | 7 |

(Δ, ○: acceptable)

As is evident from Table 2, it is understood that in Examples 1 to 3 according to the present invention the dispersion of the surface qualities and the strengths is small as compared with in Comparative Example 2 according to the conventional process.

Example 4

Prepregs (width of 760 mm×length of 800 mm) having a structure shown in Table 1 were stacked from the first layer to the fifth layer in the order shown in Table 1 and pressed. Thereafter, it was divided into 20 pieces each having a width of 38 mm by cutting by a cutting apparatus to prepare reinforcing fiber partial layer materials. Using them, 10 preforms for a racket were formed and 10 rackets were made by molding in a mold in a manner similar to that of Example 2. When estimating the rackets obtained with surface quality and strength in a manner similar to that of Example 2, the result obtained was almost the same as that of the Examples shown in Table 2. Where, the time taken from the stacking of the prepregs until the forming of the racket through the cutting was about 12 minutes for making 10 rackets in a condition of two operators.

Comparative Example 3

The Prepregs (width of 760 mm×length of 1800 mm) having a structure shown in Table 1 were stacked from the first layer to the fifth layer in the order shown in Table 1. However, a releasing paper of a double-side acting type was disposed at each position between the layers so that the respective layers were not bonded to each other. Then, it was divided into 20 pieces each having a width of 38 mm in the manner used in Example 4, the releasing papers were peeled, and 10 preforms for a racket were prepared in the completely same manner as that of Comparative Example 2.

The time required for these steps was about 45 minutes in a condition of the same two operators as those of Example 4. Namely, the time required for the operation for preparing a preform according to the present invention could be shortened to about ¼ of that of the conventional operation.

Example 5

In Examples 2 and 3, when the overlapped portion of the reinforcing fiber partial layer materials (overlapped area) was set to meet with the position provided with gut holes and molded, even though the gut was stretched at a gut tension of 40 kg in value of high tension test, cracks did not occur around the gut holes over all of 20 rackets. On the contrary, when the gut holes were provided at a position other than the overlapped portion of the partial layer materials, cracks occurred around the gut holes in 6 rackets among 20 rackets when the gut was stretched at a gut tension of 40 kg in value of high tension test. Thus, it is understood that setting of the overlapped portion to the portion of gut stretching is extremely effective.

As described above, by forming a preform with a so-called two-part structure, because the preform can be easily moved up to the inner wall surface of the cavity smoothly at the time of pressure molding, a good surface quality and a high strength can be obtained and the nonuniformity thereof can be suppressed small. Further, the time for preparing a preform by stacking the prepregs can be greatly shortened as compared with that in the conventional process. This is due to the simplification of the preform stacking step, and thereby the process for producing the preform can be easily automized.

Example 6

Braiding machines for a round braid with 48 strings were disposed at three stages, bundles of carbon fibers were braided in a form of three layers each having a braiding angle of 30 degrees around a nylon expansive tube with a thickness of 50 μm and a folded width of 27 mm and two bundles of carbon fibers, the braid was dipped in an epoxy resin solution, the resin was impregnated at a weight ratio of 40% relative to the prepreg and dried, and thereafter, nonwoven fabric tapes of carbon fibers (single fiber diameter: 7 μm, weight per unit area: 30 g/m$^2$, resin applied on one surface, tape width: 25 mm) were laminated at the resin applied surfaces thereof onto both surfaces of the braid by pressing by calendering, and it was wound. After setting the braid prepreg in a mold for a tennis racket, it was molded by applying an air pressure of 0.8 MPa in the tube and maintaining the mold at a temperature of 200° C. for 20 minutes. Since the nylon tube and two bundles of carbon fibers were present as core materials in the braid prepreg, an elongation in the braid structure did not occur and the braid width of 25 mm could be maintained stably. Further, because the nonwoven fabric tape applied with the resin only on one surface was laminated, there was no adhesive property in the braid prepreg at all, the working ability thereof was extremely good and a molded product having no surface defects and a good quality could be obtained.

Example 7

Using the preform of Example 1, a plurality of rackets were produced in the molding process shown in FIG. 33 by elevating the pressurizing force applied in the high pressure-resistance tube from 1.5 MPa gradually. The surfaces of the rackets obtained were investigated by observation at a yoke portion and the vicinity which was one of portions in which surface defects were most likely to be generated in a racket.

As a result, an irregularity having a size capable of being observed was disappeared on the surface at a pressure of about 3 MPa, an improvement of fine voids could be recognized at 10 MPa, and a racket with no defects and excellent in quality could be obtained in any case. Further, in the process for the production, leakage of oil from the high pressure-resistance tube did not occur at all.

Example 8

Using the completely same preform as that of Example 3, 20 rackets were molded at a pressurizing force of about 5 MPa in a manner similar to that of Example 7. As a result, all of the 20 rackets obtained could have the most excellent surface quality, and the strengths thereof indicated 18 to 20 N, and all were good products.

Example 9

FRP rackets were produced by RTM process. A nylon tube was coated on a mandrel prepared by gathering 8 CFRP (carbon fiber reinforced plastic) wire materials each having a diameter of 5 mm and a length of 2,000 mm, and after forming a helical winding layer of carbon fibers (inner layer:±15 degrees×3 layers, outer layer: 60 degrees×1 layer) around the nylon tube using filament winding process, the mandrel was taken off to obtain a preform.

Then, the preform was set in a split mold which had been heated at a temperature near the molding temperature in advance and had a cavity with a shape of a racket, an upper mold was closed, a compressed air of 0.1 MPa was introduced into the nylon tube to pressurize the inside of the nylon tube, and while reducing the pressure to a gauge pressure of −95,000 Pa by vacuuming from a suction port provided on the upper mold, a mixture of a preheated epoxy resin and a curing agent prepared by mixing using a two-liquid mixing piston type resin injection machine was injected from a resin injection port changing the injection speed (Table 3). When the resin reached the suction port, the suction and the injection were stopped, the pressure in the nylon tube was elevated to 0.6 MPa, and the injection port and the suction port were opened so that excessive resin was discharged out from the cavity. Further, the condition was maintained for 15 minutes as it was, and after the resin was cured, the molded product was taken off from the mold, and it was treated with a post-cure treatment at 130° C. for 2 hours to obtain a racket. As a result, a racket good in surface quality could be obtained by optimizing the resin injection speed and injection pressure.

The viscosity of the resin was determined by a B-type viscometer, and the "Tg" was determined by a DSC in an atmosphere of nitrogen at a temperature raising speed of 40° C./min.

molding and has less surface defects and an excellent strength, it can be applied broadly for any FRP curved pipe, particularly adequately for an FRP racket. Further, since an FRP curved pipe having such excellent quality and properties can be produced stably and at a low cost in the process for producing a curved pipe according to the present invention, it can be applied broadly for production of an FRP curved pipe, particularly adequately for production of an FRP racket.

We claim:

1. A curved pipe of fiber reinforced plastics material comprising an inner layer including a reinforcing fiber and an outer layer including a non-woven fabric having a single fiber diameter of not greater than 20 μm and a weight per unit area of not greater than 100 g/m².

2. The curved pipe according to claim 1, wherein said inner layer includes a unidirectionally aligned material and a woven fabric of reinforcing fibers.

3. The curved pipe according to claim 1, wherein said inner layer has four or fewer reinforcing fiber partial layers, each reinforcing fiber partial layer has plural laminae of reinforcing fiber materials and a C-shape cross section, and an opening of an inner reinforcing fiber partial layer is covered with an outer reinforcing fiber partial layer.

4. The curved pipe according to claim 1, wherein said inner layer includes a unidirectionally aligned material and a braid of reinforcing fibers.

5. The curved pipe according to any of claims 1 to 3 or 4, wherein fibers forming said non-woven fabric have fiber lengths of 1 to 30 mm.

6. The curved pipe according to any of claims 1 to 3 or 4, wherein said outer layer is disposed over the full length of the curved pipe.

TABLE 3

| | Temperature of resin (° C.) | Injection speed (g/sec) | Resin viscosity at the temperature (Pa · S) | Pressure of resin injection (MPa) | Surface quality of molded product | Tg of molded product (° C.) | Remark |
|---|---|---|---|---|---|---|---|
| 1 | 50 | 5.0 | 0.4 | 1.0 | ○ | 133 | |
| 2 | 50 | 1.0 | 0.4 | 0.23 | ○ | 138 | |
| 3 | 50 | 7.0 | 0.4 | 1.5 | Δ~○ | 135 | There are non-impregnated portions. |
| 4 | 50 | 0.5 | 0.4 | 0.25→1.2 | x | 131 | The viscosity of the extracted resin becomes high. |

Example 10

A nylon tube was coated on a mandrel having a diameter of 16 mm and a length of 2,000 mm, and a braid formed by braiding 48 bundles of carbon fibers each having 6,000 filaments was stacked around the nylon tube in a form of two-layer structure. Further, a braid formed by braiding 48 bundles of carbon fibers each having 3,000 filaments was stacked thereon by one layer, and then, the mandrel was taken off to obtain a preform.

Then, using an epoxy resin and a curing agent (the viscosity after mixing was 0.4 Pa·S at 50° C.), molding was carried out in the same conditions as those of Example 9 other than a condition where the injection speed was change to 2 g/sec. at 50° C. The surface of the racket obtained was good. The "Tg" was 132° C.

Industrial Applications of the Invention

Since the curved pipe according to the present invention is good in resin flowability and deaeration at the time of 7. The curved pipe according to any of claims 1 to 3 or 4, wherein said outer layer is disposed over the full circumference of the curved pipe.

8. A racket made from a fiber reinforced plastics material comprising an inner layer including a reinforcing fiber and an outer layer including a non-woven fabric having a single fiber diameter of not greater than 20 μm and a weight per unit area of not greater than 100 g/m².

9. The racket according to claim 8, wherein reinforcing fibers are selected from the group consisting of carbon fibers, glass fibers and polyaramide fibers.

10. The racket according to claim 8 or 9, wherein said inner layer includes a unidirectionally aligned material and a woven fabric of reinforcing fibers.

11. The racket according to any of claim 8 or 9, wherein said inner layer has four or less reinforcing fiber partial layers, each reinforcing fiber partial layer has plural laminae of reinforcing fiber materials and a C-shape cross section, and an opening of an inner reinforcing fiber partial layer is covered with an outer reinforcing fiber partial layer.

12. The racket according to any of claim 8 or 9, wherein fibers forming said non-woven fabric are selected from the group consisting of carbon fibers, glass fibers and polyaramide fibers.

13. The racket according to any of claim 8 or 9, wherein fibers forming said non-woven fabric have fiber lengths of 1 to 30 mm.

14. The racket according to any of claim 8 or 9, wherein said outer layer is disposed on a portion other than a grip of the racket.

15. The racket according to any of claim 8 or 9, wherein said outer layer is disposed on a portion other than a groove portion for gut strings.

16. The racket according to any of claim 8 or 9, wherein a wood material or a honeycomb material is disposed at least partially inside of said inner layer provided on a frame and/or a yoke.

17. The racket according to any of claim 8 or 9, wherein said inner layer provided on a grip is covered with a wood material.

18. The racket according to claim 8 or 9, wherein said inner layer includes a unidirectionally aligned material and a braid of reinforcing fibers.

* * * * *

UNITED STATES PATENT AND TRADEMARK OFFICE
CERTIFICATE OF CORRECTION

PATENT NO. : 5,960,834
DATED : October 5, 1999
INVENTOR(S) : Sekido et al

It is certified that error appears in the above-identified patent and that said Letters Patent is hereby corrected as shown below:

In column 29, under Example 4, at approximately line 23, please change "800" to -- 1800-- .

Signed and Sealed this

Nineteenth Day of September, 2000

Q. TODD DICKINSON

*Attest:*

*Attesting Officer*      *Director of Patents and Trademarks*